US011149598B2

(12) United States Patent
Niwa et al.

(10) Patent No.: US 11,149,598 B2
(45) Date of Patent: Oct. 19, 2021

(54) FUEL INJECTION CONTROL DEVICE AND FUEL INJECTION CONTROL METHOD

(71) Applicant: DENSO CORPORATION, Kariya (JP)

(72) Inventors: Masayuki Niwa, Nisshin (JP); Makoto Saizen, Kariya (JP); Makoto Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 125 days.

(21) Appl. No.: 16/751,870

(22) Filed: Jan. 24, 2020

(65) Prior Publication Data

US 2020/0157980 A1    May 21, 2020

Related U.S. Application Data

(63) Continuation of application No. PCT/JP2018/024485, filed on Jun. 28, 2018.

(30) Foreign Application Priority Data

Jul. 28, 2017  (JP) .............................. JP2017-146905

(51) Int. Cl.
| | |
|---|---|
| F02M 51/06 | (2006.01) |
| F01L 9/20 | (2021.01) |
| F02P 5/145 | (2006.01) |
| F16K 31/06 | (2006.01) |
| F02D 41/40 | (2006.01) |
| F01L 9/21 | (2021.01) |

(52) U.S. Cl.
CPC ................. *F01L 9/20* (2021.01); *F02P 5/145* (2013.01); *F16K 31/0675* (2013.01); *F01L 2009/2103* (2021.01); *F01L 2710/00* (2013.01); *F02D 41/401* (2013.01)

(58) Field of Classification Search
CPC ................. F01L 9/21; F01L 2009/2103; F01L 2009/2115; F01L 2009/2174; F02D 41/401; F02M 51/061; F02M 51/0653; F02M 51/066; F16K 31/0675
See application file for complete search history.

(56) References Cited

U.S. PATENT DOCUMENTS

| | | | |
|---|---|---|---|
| 11,004,587 B2 * | 5/2021 | Edrington | ........... F16K 31/0679 |
| 2008/0276907 A1 | 11/2008 | Abe et al. | |
| 2012/0216783 A1 | 8/2012 | Kusakabe et al. | |

(Continued)

FOREIGN PATENT DOCUMENTS

| | | |
|---|---|---|
| JP | 2013-124577 | 6/2013 |
| WO | 2019/021721 | 1/2019 |

*Primary Examiner* — Erick R Solis
(74) *Attorney, Agent, or Firm* — Nixon & Vanderhye, PC

(57) ABSTRACT

A fuel injection control device includes an additional energization unit. Concerning an undershoot state caused by a first energization for fuel injection, a return period is an estimated period required for a movable core to return to an initial position from a first energization. An injection interval ranges from the first energization to a second energization that is for a next fuel injection. An allowable period is obtained by subtracting a rise period estimated for the second energization from the return period. The additional energization unit adds an additional energization between the first energization and the second energization when the injection interval is longer than or equal to the allowable period and is shorter than or equal to the return period.

19 Claims, 18 Drawing Sheets

(56) References Cited

U.S. PATENT DOCUMENTS

| | | |
|---|---|---|
| 2012/0234299 A1 | 9/2012 | Abe et al. |
| 2015/0108238 A1* | 4/2015 | Grandi .................. F02D 41/221 |
| | | 239/5 |
| 2019/0145334 A1* | 5/2019 | Denk ...................... F02D 41/40 |
| | | 239/5 |
| 2019/0170075 A1* | 6/2019 | Satake .................... F02D 41/20 |
| 2019/0203687 A1* | 7/2019 | Yanoto ................. F02M 51/061 |
| 2019/0301412 A1* | 10/2019 | Oge .................... F02D 41/2096 |

* cited by examiner

FUEL INJECTION CONTROL DEVICE AND FUEL INJECTION CONTROL METHOD

CROSS REFERENCE TO RELATED APPLICATION

The present application is a continuation application of International Patent Application No. PCT/JP2018/024485 filed on Jun. 28, 2018, which designated the U.S. and claims the benefit of priority from Japanese Patent Application No. 2017-146905 filed on Jul. 28, 2017. The entire disclosures of all of the above applications are incorporated herein by reference.

TECHNICAL FIELD

The disclosure of this specification relates to a fuel injection control device and a fuel injection control method.

BACKGROUND

A fuel injection valve configured to inject fuel includes a movable core and a valve body. The movable core is caused to move on application of an electromagnetic attracting force generated by energizing a coil. The valve body opens the valve in conjunction with the movable core movement.

SUMMARY

According to one aspect of the present disclosure, a fuel injection control device is for a fuel injection valve. The fuel injection valve includes: an injection hole to inject fuel; a valve body configured to move in a valve opening direction to open the injection hole; a fixed core configured to generate an electromagnetic attracting force on energization of a coil; a movable core configured to move from a specified initial position in the valve opening direction relative to the valve body when attracted by the fixed core to move the valve body in the valve opening direction; and a valve body biasing member that biases the valve body in a valve closing direction opposite to the valve opening direction.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
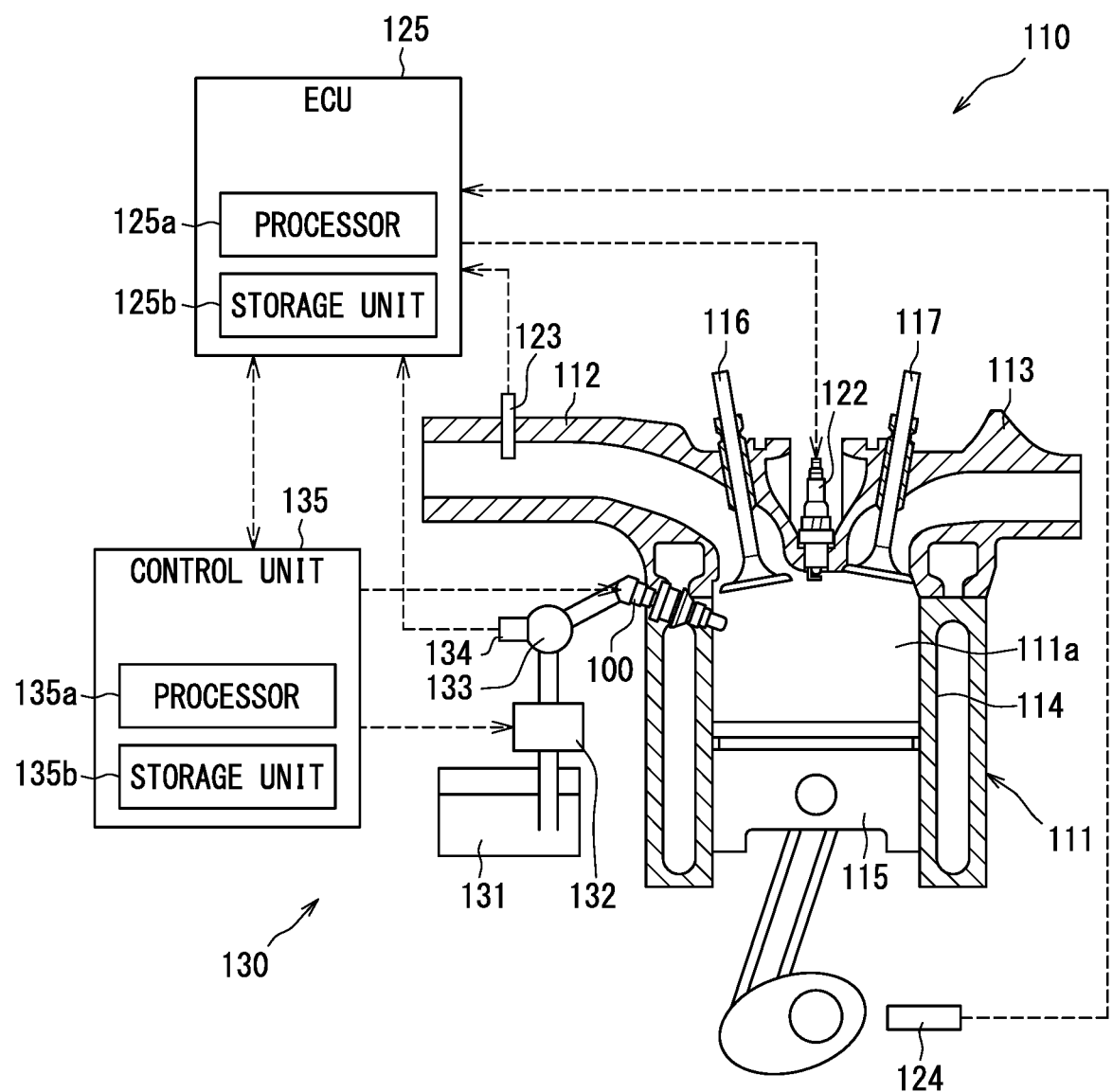
FIG. 1 is a schematic diagram illustrating a combustion system according to a first embodiment.

To begin with, examples of the present disclosure will be described.

According to an example of t present disclosure, a fuel injection valve includes a movable core and a valve body. The movable core is caused to move on application of an electromagnetic attracting force generated by energizing a coil. The valve body opens the valve in conjunction with the movable core movement.

According to the example, the movable core and the valve body are movable relatively to each other. In this configuration, even when the valve body moves in the valve closing direction and stops at the valve closing position to close an injection hole, the movable core does not stop at an initial position corresponding to a valve closing position of the valve body and continues moving in a valve closing direction relative to the valve body.

The movable core may be positioned toward the valve closing side instead of the initial position even when the valve body stops at the valve closing position. This state is described as undershoot.

It is assumable that next energization is implemented on the coil to cause an electromagnetic attracting force to attract the undershooting movable coil. In this case, the electromagnetic attracting force could forcedly retract the undershooting movable coil in the valve opening direction. Consequently, the movable core may not stop at the initial position and pass the initial position toward the valve opening side.

The inventors found that the movable core passes through the initial position toward the valve opening side, quickly changes the movement to the valve closing direction, and returns to the initial position depending on the timing to apply the electromagnetic attracting force to the undershooting movable core or depending on the magnitude of the electromagnetic attracting force. It would be concerned about causing an erratic injection that accidentally temporarily injects the fuel when the movable core accidentally moves temporarily to the valve opening side instead of the initial position.

According to a first example of the present disclosure, a fuel injection control device is for a fuel injection valve. The fuel injection valve includes: an injection hole to inject fuel; a valve body configured to move in a valve opening direction to open the injection hole; a fixed core configured to generate an electromagnetic attracting force on energization of a coil; a movable core configured to move from a specified initial position in the valve opening direction relative to the valve body when attracted by the fixed core to move the valve body in the valve opening direction; and a valve body biasing member that biases the valve body in a valve closing direction opposite to the valve opening direction. The movable core is configured to start moving in the valve opening direction on lapse of a rise period that is required to raise the electromagnetic attracting force on the energization. The valve body is configured to move in the valve closing direction by application of a biasing force of the valve body biasing member to move the movable core in the valve closing direction. The movable core is configured to change its movement direction to the valve opening direction and to return to the initial position in an undershoot state in which the movable core continues moving in the valve closing direction even in a state where the valve body moving in the valve closing direction stops. A return period is an estimated period required for the movable core, which is in the undershoot state caused by first energization for fuel injection, to return to the initial position from the first energization. An injection interval ranges from the first energization to a second energization that is for a next fuel injection. An allowable period is a period obtained by subtracting the rise period estimated for the second energization from the return period. The fuel injection control device comprises an additional energization unit configured to add an additional energization between the first energization and the second energization when the injection interval is longer than or equal to the allowable period and is shorter than or equal to the return period.

When the electromagnetic attracting force occurs in the fuel injection valve while the movable core stops at the initial position, the movable core is considered not to start moving in the valve opening direction when the electromagnetic attracting force is insufficient. Meanwhile, the inventors found that the electromagnetic attracting force accelerates the undershooting movable core to easily cause an erratic fuel injection when the injection interval is longer than or equal to the allowable period and is shorter than or equal to the return period. According to this finding, the electromagnetic attracting force is applied to the undershooting movable core that is moving in the valve opening direction based on core boost mode. Subsequently, the movable core in the core boost mode is accelerated even though the electromagnetic attracting force is not fully activated. When the accelerated movable core reaches the initial position, the valve body is highly likely to accidentally move in the valve opening direction along with the movable core due to the propelling force of the movable core. Meanwhile, the movable core moves to the valve closing side rather than the initial position. The biasing force of the valve body biasing member overrides the insufficiently activated electromagnetic attracting force. Therefore, the movable core changes the movement to the valve closing direction, returns to the initial position, and accordingly closes the valve body. Erratic fuel injection is considered to occur in this manner.

According to the above-mentioned first example, the additional energization is performed between the first energization and the second energization when the injection interval is longer than or equal to the allowable period and is shorter than or equal to the return period. In this case, the electromagnetic attracting force accelerates the movable core to shorten the actual return period. It is possible to make the actual return period shorter than the injection interval. It is possible to prevent the condition of causing an erratic injection, namely, the injection interval is shorter than or equal to the return period. Therefore, the configuration enables to inhibit an erratic injection from occurring.

According to a second example of the present disclosure, the fuel injection control device comprises an additional energization unit configured to add an additional energization between the first energization and the second energization when a return timing, at which the movable core in the undershoot state caused by a first energization for fuel injection is estimated to return to the initial position, is in the rise period estimated for a second energization that is for a next fuel injection.

The inventors found that, as a condition of causing the erratic fuel injection, the return timing for the undershoot occurring due to the first energization is included in the rise period for the second energization. When this condition is satisfied, the erratic fuel injection is considered to occur similarly to the above-mentioned description according to the first example.

According to the above-mentioned second example, the additional energization is performed between the first energization and the second energization when the return timing due to the first energization is included in the rise period for the second energization. In this case, the electromagnetic attracting force accelerates the movable core to cause the actual return timing to occur earlier. The actual return timing can occur earlier than the rise period for the second energization. It is possible to prevent the condition of causing an erratic injection, namely, the return timing due to the first energization is included in the rise period for the second energization. Therefore, the configuration enables to inhibit an erratic injection from occurring similarly to the above-mentioned first example.

According to a third example of the present disclosure, the fuel injection control device comprises a changing energization portion configured to change a mode of the second energization, when the injection interval is longer than or equal to the allowable period and is shorter than or equal to the return period, to shorten the rise period estimated for the second energization to be shorter than: the rise period in a case where the injection interval is shorter than the allowable period; and the rise period in a case where the injection interval is longer than the return period.

According to the third example, the condition of causing an erratic injection signifies that the injection interval is longer than or equal to the allowable period and is shorter than or equal to the return period. When this condition is satisfied, the rise period for the second energization is shorter than the same applied to a case where the condition is not satisfied. If the erratic condition is satisfied, the allowable period is extended correspondingly to the shortened rise period for the second energization. When the allowable period is positively extended, the configuration enables to avoid the condition of causing an erratic injection that the injection interval is longer than or equal to the allowable period. Therefore, the configuration enables to inhibit an erratic injection from occurring similarly to the above-mentioned first example.

A decrease in the rise period increases the degree of increase in a current flowing through the coil due to the second energization. Even if the allowable period is not longer than the injection interval, a drastic increase in the electromagnetic attracting force enables to allow the movable core to easily continue moving in the valve opening direction. In this case, the configuration enables to prevent a situation where the movable core passes through the initial position due to undershooting, changes the moving direction, and returns to the initial position. Therefore, the configuration enables to inhibit an erratic injection from occurring.

According to a fourth example of the present disclosure, the fuel injection control device comprises a pre-energization portion configured to add a pre-energization that starts at a timing earlier than the second energization and continues until start of the second energization when the injection interval is longer than or equal to the allowable period and is shorter than or equal to the return period.

According to the above-mentioned fourth example, the pre-energization is performed at the timing earlier than the second energization when the injection interval is longer than or equal to the allowable period and is shorter than or equal to the return period. In this case, the pre-energization activates the electromagnetic attracting force at the timing before the second energization starts. Consequently, the configuration enables to shorten the period required to for the second energization to activate the electromagnetic attracting force. Similarly to the above-mentioned third example, the configuration enables to avoid the condition of causing an erratic injection that the allowable period is extended correspondingly to the shortened rise period for the second energization and the injection interval is longer than or equal to the allowable period. Therefore, the configuration enables to inhibit an erratic injection from occurring similarly to the above-mentioned third example.

Similarly to the above-mentioned third embodiment, a decrease in the rise period increases the degree of increase in a current flowing through the coil due to the second energization. Therefore, the configuration enables to inhibit an erratic fuel injection from occurring.

According to a fifth example of the present disclosure, the fuel injection control method comprises adding an additional energization between the first energization and the second energization when the injection interval is longer than or equal to the allowable period and is shorter than or equal to the return period. According to the above-mentioned fifth example, the method enables to inhibit an erratic injection from occurring similarly to the above-mentioned first example.

Embodiments of the present disclosure will be described in further detail with reference to the accompanying drawings. The same reference numerals may be used for the mutually corresponding elements in the embodiments to omit a duplicate description. When a subsequent embodiment describes only part of the configuration, the other part of the configuration applies to the corresponding part of the configuration described in the preceding embodiment. Combinations of the configurations are not limited to those explicitly described in the embodiments. The configurations of the embodiments may be partially combined, even if not explicitly described, except an invalid combination. The description below will disclose an implicit combination of the embodiments and the configurations described in the modifications.

First Embodiment

An injector 100 illustrated in FIG. 1 is included in a combustion system 110. The combustion system 110 includes an internal combustion engine 111, an intake pipe 112, and an exhaust pipe 113. The internal combustion engine 111 represents an ignited engine such as a gasoline engine. The intake pipe 112 supplies intake air to a combustion chamber 111a of the internal combustion engine 111. The exhaust pipe 113 exhausts the exhaust gas from the combustion chamber 111a.

The internal combustion engine 111 includes a cylinder 114, a piston 115, an intake valve 116, an exhaust gas valve 117, the injector 100, an ignition plug 122, an intake pressure sensor 123, a crank angle sensor 124, and an ECU 125 in addition to the injector 100. The piston 115 is reciprocatively provided in the cylinder 114. The combustion chamber 111a is interconnected to the intake pipe 112 and the exhaust pipe 113 via an intake port and exhaust gas port. The intake valve 116 opens and closes the intake port. The exhaust gas valve 117 opens and closes the exhaust gas port. The injector 100 provides a fuel injection valve to inject fuel and directly injects the fuel into the combustion chamber 111a. The ignition plug 122 ignites an air-fuel mixture of the intake air and the fuel in the combustion chamber 111a. The intake pressure sensor 123 is attached to the intake pipe 112 and detects the pressure in the intake pipe 112 as an intake pressure. The crank angle sensor 124 is attached to a crankshaft and detects a crank angle.

The ECU (Engine Control Unit) 124 represents a control device that controls the operation of the combustion system 110. The ECU 125 includes a computer configured to mainly include a processor 124a, a storage unit 124b, and an input/output interface. The storage unit 124b uses a recording medium such as RAM. In the ECU 125, the storage unit 124b mainly stores a program to control the operation of the combustion system 110. The processor 124a executes the program. The ECU 125 is electrically connected to various detection portions such as the intake pressure sensor 123 and the crank angle sensor 124. Based on detection results from these detection portions, the ECU 125 performs engine control such as operation control over the ignition plug 122 and angle control over a throttle valve. The intake pressure sensor 123 and the ECU 125 can be referred to as an engine control device. The combustion system 110 can be referred to as an engine control system.

The combustion system 110 includes a fuel supply system 130 that supplies the fuel to the combustion chamber 111a. The fuel supply system 130 includes a fuel tank 131, a fuel pump 132, a fuel delivery 133, an injection pressure sensor 134, and a control unit 135 in addition to the injector 100. The fuel tank 131 stores the fuel. The fuel pump 132 provides a high-pressure pump that supplies the injector 100 with the fuel in the fuel tank 131 by pressurizing the fuel. The combustion system 110 includes a plurality of injectors 100. The fuel delivery 133 distributes the fuel to the injectors 100. The injection pressure sensor 134 is provided for the fuel delivery 133 and detects an injection pressure, namely, the pressure of the fuel supplied to the injector 100.

The control unit 135 controls operations of the fuel supply system 130. The control unit 135 includes a computer configured to mainly include a processor 135a, a storage unit 135b, and an input/output interface. The storage unit 135b uses a recording medium such as RAM. In the control unit 135, the storage unit 135b mainly stores a program to control operations of the injector 100. The processor 135a executes the program. The control unit 135 is electrically connected to various detection portions such as the injection pressure sensor 134. Based on detection results from the detection portions, the control unit 135 performs fuel injection control, namely, the control over operations of the injector 100 and the fuel pump 132. The control unit 135 is comparable to a fuel injection control device that performs operation control over the injector 100 as the fuel injection valve. In a vehicle, an SCU (Sensor Control Unit) may be used as the control unit 135.

Figure 2:
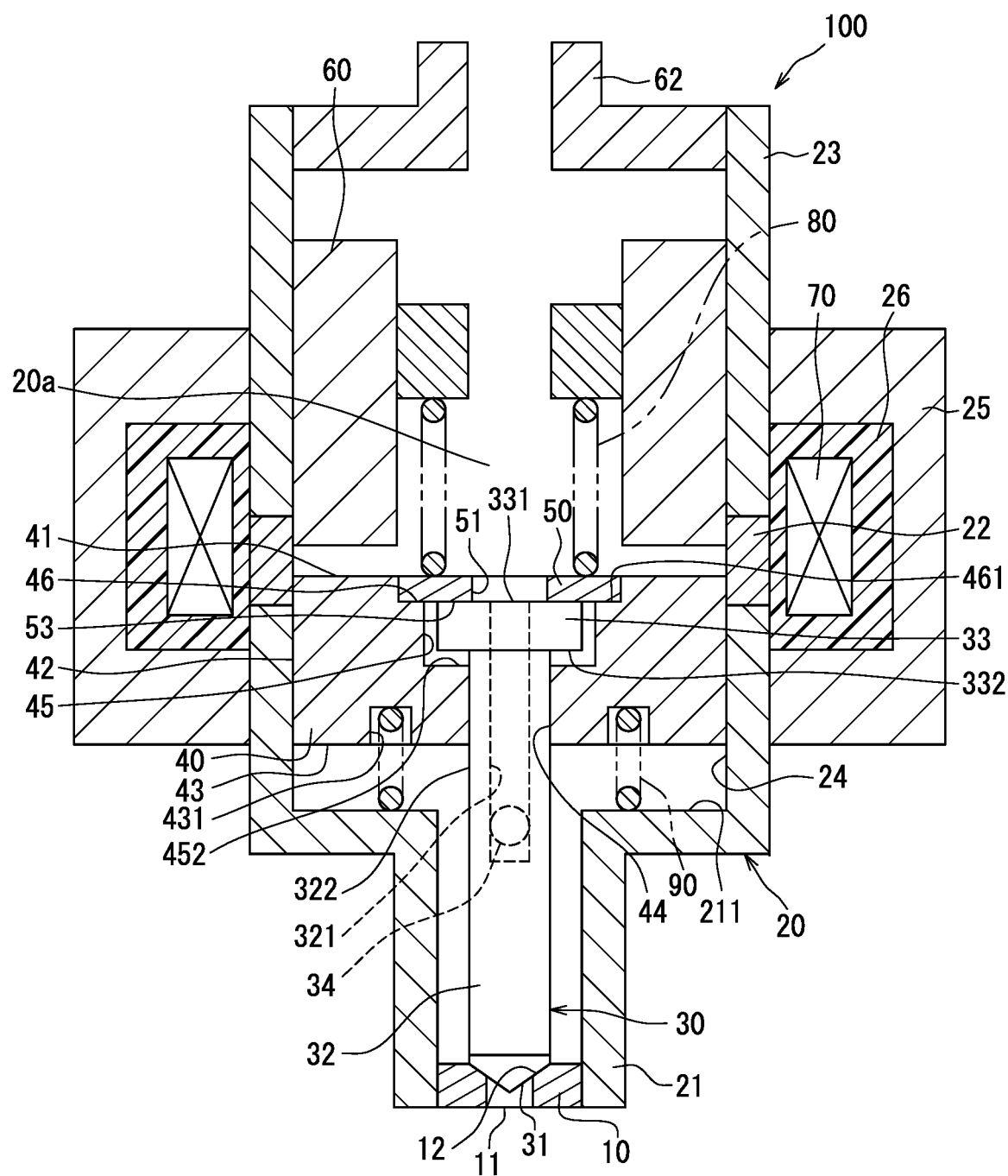
FIG. 2 is a vertically sectional view illustrating a schematic configuration of a fuel injection valve.

The injector 100 as illustrated in FIG. 2 mainly includes a housing 20, a nozzle portion 10, a fixed core 60, a movable core 40, a needle 30 as a valve body, a movable plate 50, a first spring 80, a second spring 90, and a coil 70. In the injector 100, a driving portion to move the needle 30 includes the movable core 40, the fixed core 60, the coil 70, and the first spring 80.

The housing 20 includes a first cylinder member 21, a second cylinder member 22, a third cylinder member 23, an outer periphery member 25, and a resin mold portion 26. The first cylinder member 21, the second cylinder member 22, and the third cylinder member 23 are formed to be approximately cylindrical. The first cylinder member 21, the second cylinder member 22, and the third cylinder member 23 are coaxially placed in this order and are interconnected. The outer periphery member 25 makes contact with outer peripheral surfaces of the first cylinder member 21 and the third cylinder member 23. The first cylinder member 21, the third cylinder member 23, and the outer periphery member 25 are made of a magnetic material such as ferritic stainless steel. The second cylinder member 22 is made of a non-magnetic material such as austenite stainless steel.

The nozzle portion 10 is provided at an edge of the first cylinder member 21 and is shaped into a metal disk. An injection hole 11 is formed at the center of the nozzle portion 10 to pierce the nozzle portion 10 in the plate thickness direction. A circular valve seat 12 is formed on a surface of the nozzle portion 10 to surround the injection hole 11. The nozzle portion 10 is connected to the first cylinder member 21 such that a sidewall engages with an inner wall of the first cylinder member 21.

The fixed core 60 is provided at an edge of the third cylinder member 23. The fixed core 60 is made of a magnetic material such as ferritic stainless steel and is formed to be approximately cylindrical. The fixed core 60 is provided inside the housing 20. The fixed core 60 and the nozzle portion 10 are welded and fastened to the housing 20.

The needle 30 is made of steel such as martensite stainless steel and is formed into a bar. The needle 30 is reciprocatively accommodated in the housing 20 in the axial direction. The needle 30 includes a body 32, a sealing portion 31, and a flange portion 33. The body 32 is shaped into a bar and extends in the axial direction. The sealing portion 31 is formed at an edge of the body 32 toward the nozzle portion 10. The flange portion 33 is formed at an edge of the body 32 opposite the nozzle portion 10. The sealing portion 31 opens or closes the injection hole 11 by allowing the sealing portion 31 to leave the valve seat 12 (unseating) or make contact with the valve seat 12 (seating). In the description below, the direction to detach the needle 30 from the valve seat 12 is referred to as a valve opening direction and the direction to allow the needle 30 to make contact with the valve seat 12 is referred to as a valve closing direction as needed. The body 32 is shaped into a hollow cylinder at the flange portion 33 and includes a hole 34 formed to connect an inner wall 321 and an outer wall 322 of the body 32. The flange portion 33 is shaped into a disk expanding toward an inner wall 24 of the housing 20.

The movable core 40 is made of a magnetic material such as ferritic stainless steel and is formed to be approximately cylindrical. The movable core 40 is accommodated in the housing 20 to be able to reciprocate between the fixed core 60 and the nozzle portion 10. A through-hole 44 is formed at the center of the movable core 40. An inner wall of the through-hole 44 in the movable core 40 can slide on an outer wall 322 of the body 32 of the needle 30. An outer wall 42 of the movable core 40 can slide on the inner wall 24 of the housing 20. Therefore, the movable core 40 can reciprocate inside the housing 20 while sliding on the needle 30 and the housing 20.

The movable core 40 includes a recessed container portion 45 that is formed on an end face 41 toward the fixed core 60 to circularly expand in a radial direction from the inner wall of the through-hole 44 toward the outside. The movable core 40 includes an engaging groove portion 46 that is formed on the end face 41 toward the fixed core 60 to circularly expand in a radial direction from an end portion opposite a bottom wall 452 of the recessed container portion 45 toward the outside. The recessed container portion 45 accommodates the flange portion 33 of the needle 30. The engaging groove portion 46 engages with the movable plate 50 to be described later.

The movable plate 50 is made of metal such as martensite stainless steel, is shaped into a disk having a diameter larger than that of the recessed container portion 45, and includes a hole 51 at the center. The movable plate 50 is provided opposite the nozzle portion 10 of the movable core 40 to be able to make contact with the movable core 40 and the flange portion 33 of the needle 30. The movable plate 50 is provided to be able to engage with the engaging groove portion 46.

The coil 70 is formed to be approximately cylindrical and is provided to surround the outside of the second cylinder member 22 and the third cylinder member 23 in the radial direction. The resin mold portion 26 is filled in among the first cylinder member 21, the second cylinder member 22, the third cylinder member 23, and the outer periphery member 25.

The coil 70 is supplied with electric power and generates a magnetic force. Subsequently, a magnetic circuit is formed in the fixed core 60, the movable core 40, the first cylinder member 21, the third cylinder member 23, and the outer periphery member 25. The electromagnetic attracting force acts on the movable core 40, allowing the fixed core 60 to attract the movable core 40. The bottom wall 452 of the recessed container portion 45 makes contact with the flange portion 33 of the needle 30. The needle 30 moves along with the movable core 40 toward the fixed core 60, namely, in the valve opening direction. The sealing portion 31 is thereby separated from the valve seat 12 to open the injection hole 11. The end face 41 makes contact with the fixed core 60, limiting the movement of the movable core 40 in the valve opening direction.

The first spring 80 makes contact with the movable plate 50 to apply elastic force and thereby biases the movable core 40 and the needle 30 in the valve closing direction. The second spring 90 makes contact with the movable core 40 to apply elastic force and thereby biases the movable plate 50 toward the fixed core 60, namely, in the valve opening direction. The biasing force applied to the first spring 80 is larger than the biasing force applied to the second spring 90. When no power is supplied to the coil 70, the needle 30 closes the valve by allowing the sealing portion 31 to make contact with the valve seat 12. The first spring 80 is comparable to a valve body biasing member that biases the valve body. The second spring 90 is comparable to a core biasing member that biases the fixed core 60.

The second spring 90 is provided such that a first end makes contact with the bottom of a groove portion 431 formed on an end face 43 at the injection hole 11. A second end of the second spring 90 makes contact with a circular stepped surface 211 formed inside the first cylinder member 21 of the housing 20. The second spring 90 applies force extending in the axial direction. The second spring 90 biases the movable core 40 and thereby biases the movable plate 50 toward the fixed core 60. In this case, the position of the movable core 40 is referred to as initial position B1. When the movable core 40 stays at initial position B1, the end face 43 of the movable core 40 leaves the stepped surface of the first cylinder member 21 toward the side opposite the injection hole 11 in the axial direction. Therefore, the movable core 40 can move to the injection hole 11 rather than initial position B1.

Figure 3:
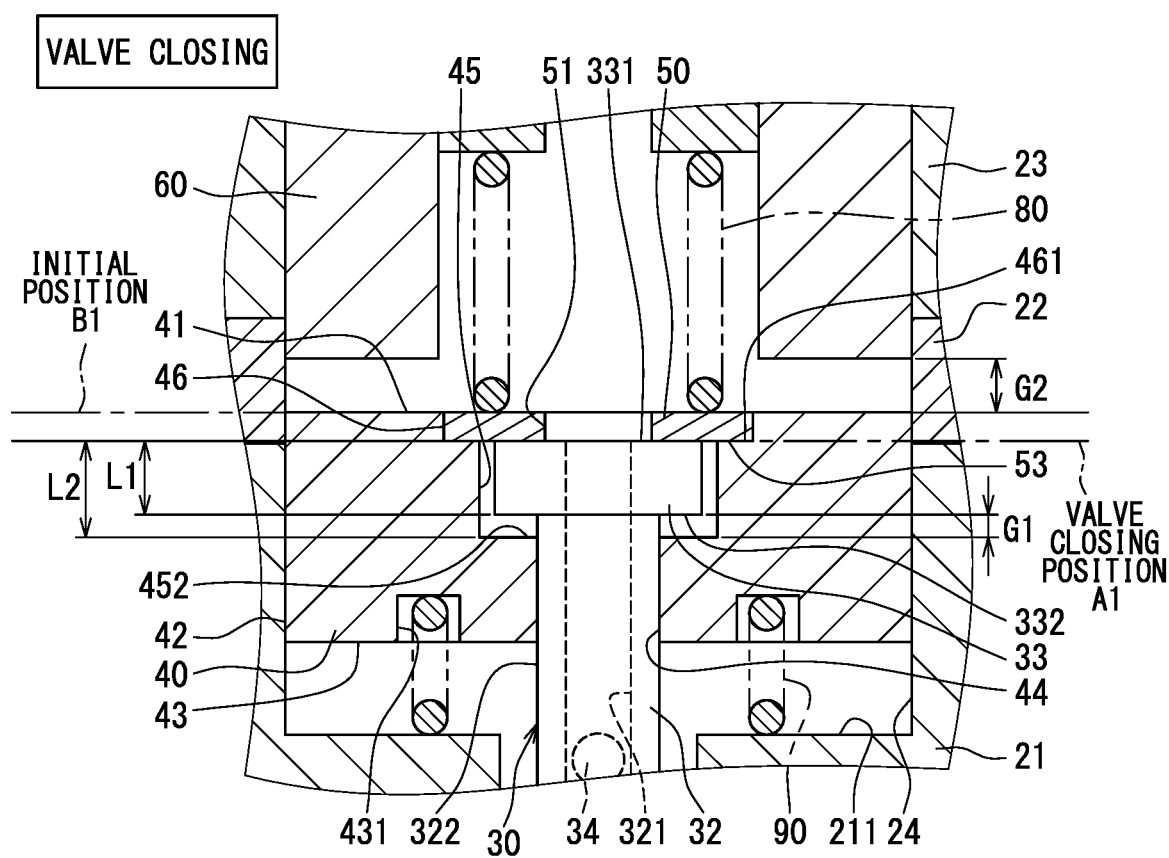
FIG. 3 is a diagram illustrating a state of opening the fuel injection valve.

When the coil 70 is turned off as illustrated in FIG. 3, the biasing force of the first spring 80 and the second spring 90 allows the movable plate 50 to make contact with the needle 30 and the movable core 40. Specifically, a bottom end face 53 of the movable plate 50 makes contact with an end face 331 of the flange portion 33 of the needle 30 and a bottom wall 461 of the engaging groove portion 46 of the movable core 40. In this case, the movable core 40 and the needle 30 maintain the state of closing the valve. The position of the needle 30, in this case, is referred to as valve closing position A1. It is supposed that L1 denotes the length of the flange portion 33 in the axial direction and L2 denotes the distance between the bottom end face 53 of the movable plate 50 and the bottom wall 452 of the recessed container portion 45. Subsequently, the flange portion 33, the movable plate 50, the recessed container portion 45, and the engaging groove portion 46 are formed to satisfy the relationship of L1<L2.

It is supposed that G1 denotes the distance between a bottom end face 332 of the flange portion 33 and the bottom wall 452 of the recessed container portion 45 in the axial direction and G2 denotes the distance between the end face 41 of the movable core 40 and the end face of the fixed core 60 at the movable core 40 in the axial direction. Subsequently, the flange portion 33, the movable plate 50, the recessed container portion 45, the engaging groove portion 46, the movable core 40, and the fixed core 60 are formed to satisfy the relationship of G1<G2 and G1=L2−L1.

Returning to FIG. 2, an approximately cylindrical fuel introduction pipe 62 is press-fit and welded at the end of the third cylinder member 23. The fuel supplied from the fuel introduction pipe 62 flows through the fixed core 60, the hole 51 of the movable plate 50, the inside of the body 32 of the needle 30, the hole 34 of the needle 30, and between the first cylinder member 21 and the needle 30. When the coil 70 is turned on to open the needle 30, the fuel flowing through as above flows between the sealing portion 31 and the valve seat 12 and then is injected from the injection hole 11.

The description below explains operations of the injector 100 based on FIGS. 3 through 5.

When the coil 70 is turned off, as illustrated in FIG. 3, the first spring 80 biases the movable plate 50 and thereby biases the needle 30 in the valve closing direction. The second spring 90 biases the movable core 40 toward the fixed core 60. The bottom end face 53 of the movable plate 50 makes contact with the end face 331 of the flange portion 33 of the needle 30 and the bottom wall 461 of the engaging groove portion 46 of the movable core 40, maintaining the state of L1<L2 and G1<G2 as above. The sealing portion 31 of the needle 30 is thereby seated on the valve seat 12 to cause a closed state. The injection hole 11 is closed.

Figure 4:
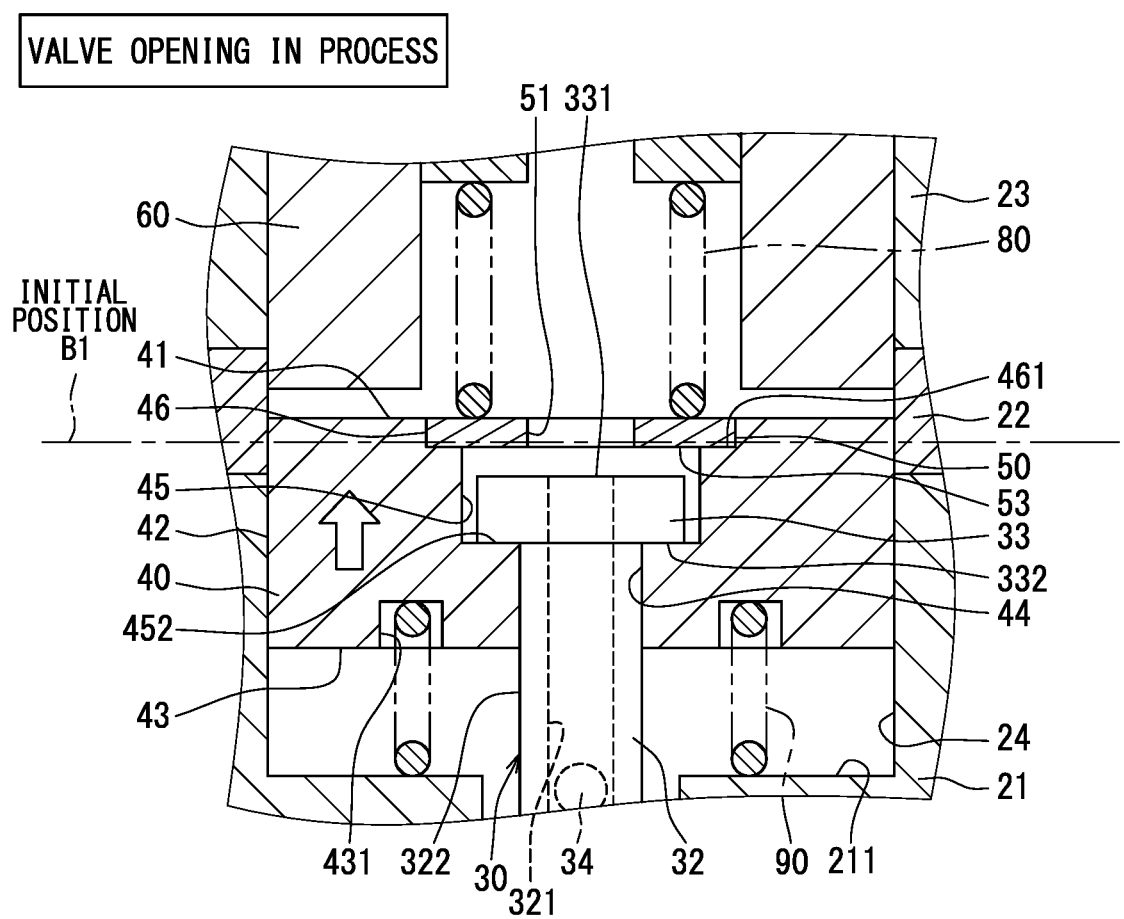
FIG. 4 is a diagram illustrating a state of being in the process of opening the fuel injection valve.

When the coil 70 is turned on, as illustrated in FIG. 4, the movable core 40 is attracted by the fixed core 60 and moves toward the fixed core 60. The movable plate 50 is pressed by the movable core 40 and moves toward the first spring 80 against the biasing force of the first spring 80. The movable core 40 is accelerated by specified distance G1. While maintaining the kinetic energy corresponding to the acceleration distance, the movable core 40 collides with the bottom end face 332 of the flange portion 33 of the needle 30. Caused by the collision, the needle 30 suddenly starts moving in the valve opening direction. The sealing portion 31 leaves the valve seat 12, injecting the fuel from the injection hole 11.

Figure 5:
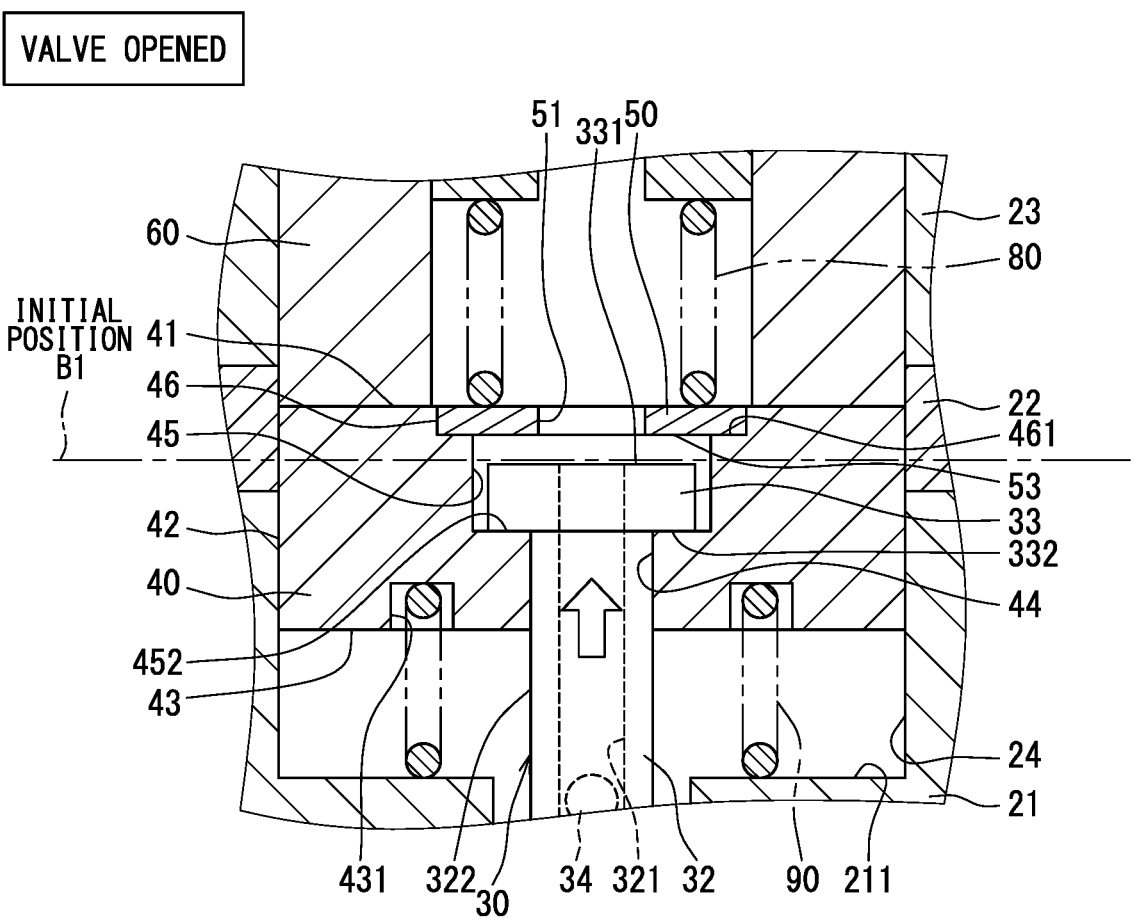
FIG. 5 is a diagram illustrating a state of completely opening the fuel injection valve.

The movable core 40 collides with the needle 30 and then further continues moving to collide with the fixed core 60 as illustrated in FIG. 5. This limits the movement of the movable core 40. The movable core 40 presses the needle 30 in the valve opening direction while the flange portion 33 engages with the bottom wall 452. The needle 30 is pressed during a period from the time the movable core 40 collides with the needle 30 to the time the movable core 40 collides with the fixed core 60.

Figure 6:
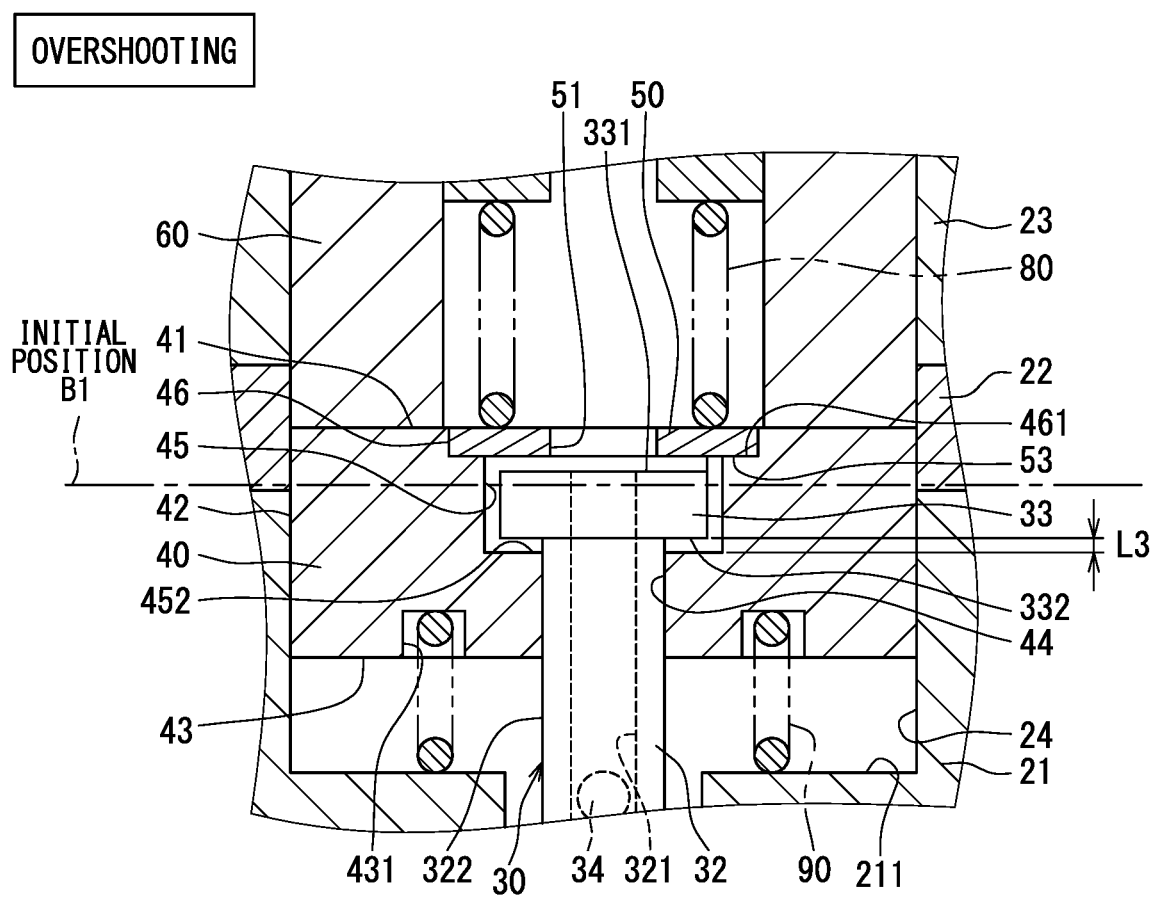
FIG. 6 is a diagram illustrating an overshooting needle of the fuel injection valve.

The movable core 40 stops moving. Meanwhile, the needle 30 leaves the movable core 40 as illustrated in FIG. 6 and continues moving by inertia against the elastic force of the first spring 80. The first spring 80 is biased against the needle 30 via the movable plate 50. After compressed to the limit, the first spring 80 then pushes back the movable plate 50 and the needle 30 in the valve closing direction. When pushed back in this manner, the movable plate 50 and the needle 30 stop moving while making contact with the movable core 40 according to the state in FIG. 4.

As above, the movable core 40 moves to make contact with the fixed core 60 but the needle 30 thereafter continues moving by inertia. This behavior is referred to overshoot. As illustrated in FIG. 6, overshoot quantity L3 is comparable to a separation distance between the needle 30 and the movable core 40 in the axial direction. Specifically, the overshoot quantity corresponds to the distance between the bottom end face 332 of the flange portion 33 and the bottom wall 452 of the recessed container portion 45.

When the coil 70 is turned off, the electromagnetic attracting force decreases. When the electromagnetic attracting force goes too low to keep opening the valve, the movable plate 50, the movable core 40, and the needle 30 move in the valve closing direction. Specifically, the first spring 80 biases the movable plate 50 toward the needle 30. The movable plate 50 then starts moving in the valve closing direction along with the movable core. The movable plate 50 then makes contact with the flange portion 33 of the needle 30 and presses the needle 30 in the valve closing direction. In other words, the elastic force of the first spring 80 is transmitted to the needle 30 via the movable plate 50 and allows the needle 30 to start closing the valve. The needle 30 moving in the valve closing direction stops moving when the sealing portion 31 makes contact with the valve seat 12.

Figure 7:
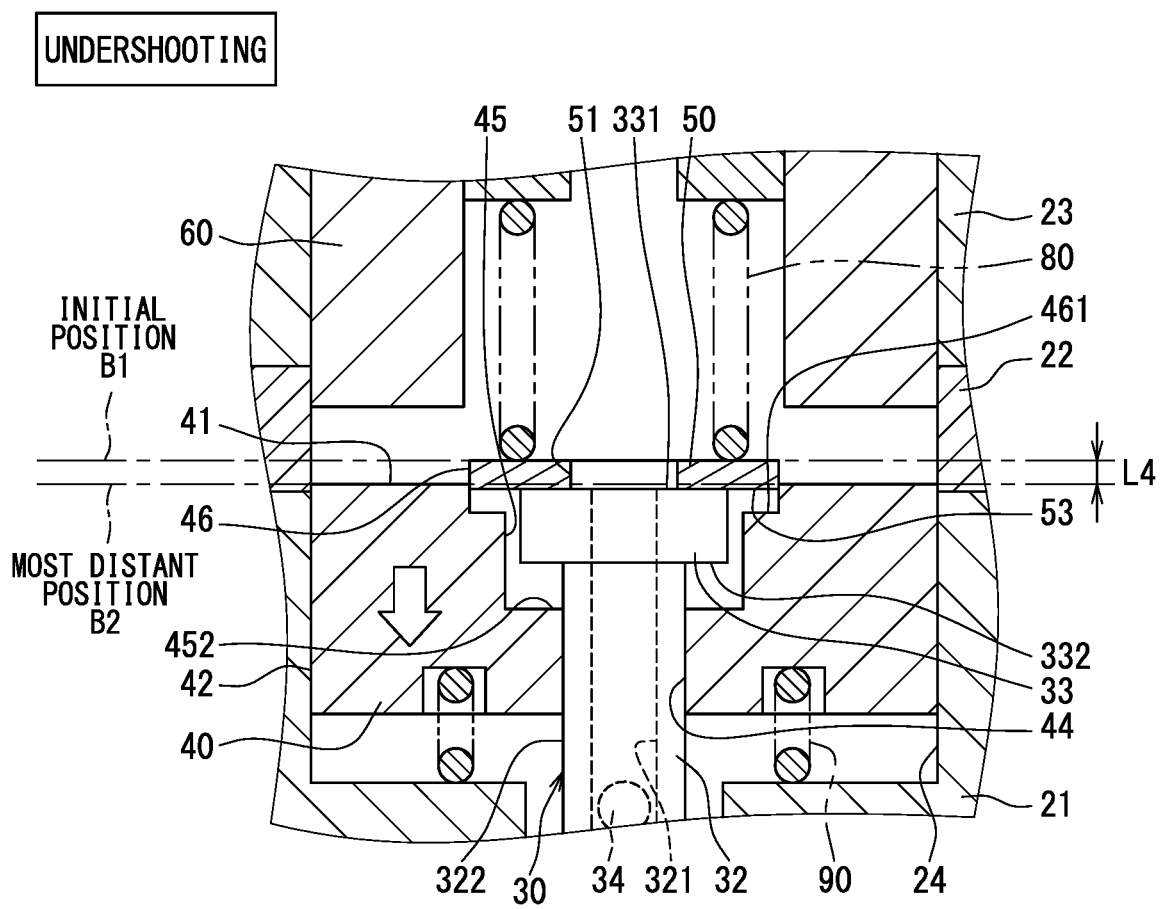
FIG. 7 is a diagram illustrating an undershooting movable core of the fuel injection valve.

The needle 30 stops moving and the movable plate 50 stops moving. Meanwhile, the movable core 40 leaves the movable plate 50 as illustrated in FIG. 7 and continues moving in the valve closing direction by inertia against the elastic force of the second spring 90. When the second spring 90 is compressed, the movable core 40 passes through initial position B1 and reaches most distant position B2. When the second spring 90 is stretched, the movable core 40 starts moving in the valve opening direction and returns to initial position B1. After returning to initial position B1 from most distant position B2, the movable core 40 is caught by the movable plate 50 and stops at initial position B1, as illustrated in FIG. 3.

The needle 30 returns to valve closing position A1 and then the movable core 40 moves to most distant position B2 instead of initial position B1. This state is referred to as undershoot. The movable core 40 in the undershoot state moves from most distant position B2 to initial position B1 in the valve opening direction. This state is referred to as core boost. The movable core 40 in the core boost state moves due to a restoring force of the second spring 90.

As illustrated in FIG. 7, the movable core 40 in the undershoot state causes a separation distance from initial position B1. The separation distance is referred to as undershoot quantity L4. Undershoot quantity L4 provides the separation distance between the movable core 40 and the movable plate 50 in the axial direction. Specifically, undershoot quantity L4 corresponds to the separation distance in the axial direction between the end face 41 of the movable core 40 at the fixed core 60 and the end face of the movable plate 50 at the fixed core 60. While undershoot quantity L4 is increasing, the movable core 40 is moving away from initial position B1 and the second spring 90 is being compressed due to the inertia of the movable core 40. While undershoot quantity L4 is decreasing, the movable core 40 is approaching initial position B1 and the second spring 90 is being stretched due to its elastic force.

As above, the movable plate 50 moves along with the movable core 40 in the axial direction. The timing to start moving the movable plate 50 equals the timing to start moving the movable core 40 whether the valve is closed or opened. However, the timing to start moving the needle 30 occurs later than the timing to start moving the movable core 40 whether the valve is closed or opened. However, the description of operations of the injector 100 ignores a difference between the timings to start moving the needle 30 and the movable core 40 and assumes that the needle 30 starts moving simultaneously with the movable core 40. This is feasible according to a configuration that allows the flange portion 33 of the needle 30 to be caught by the movable core 40 when the movable plate 50 is not provided, the first spring 80 directly biases the needle 30, and the movable core 40 stays at the initial position.

The movable plate 50 is configured independently of the movable core 40 and provides a moving member that moves with the movable core 40. The movable plate 50 is pushed by the movable core 40 to move in the valve opening direction and is pushed by the first spring 80 to move in the valve closing direction. When pushed by the first spring 80 to move, the movable plate 50 functions as a valve closing force transmission member that transmits the elastic force of the first spring 80 to the needle 30.

The control unit 135 outputs a drive signal as an electric signal to the injector 100 and thereby allows the injector 100 to inject the fuel. The injector 100 energizes the coil 70 according to the drive signal. In this case, a drive current corresponding to the drive signal flows through the coil 70. The control unit 135 enables the injector 100 to perform a multi-stage injection, namely, inject the fuel more than once per combustion cycle. The drive signal may be referred to as a drive directive signal or an injection directive signal.

With reference to FIGS. 8 through 11, the description below explains the behavior of the movable core 40 when the multi-stage injection is performed. In the description below, the transition of the drive signal to a high level is described as ON. The transition of the drive signal to a low level is described as OFF. A previous drive signal is described as first drive signal DS1. A present drive signal is described as second drive signal DS2. In FIGS. 8 through 11, first drive signal DS1 turns OFF at timing ta1 and second signal C2 turns ON at timing ta2. A period between first drive signal DS1 and second drive signal DS2 is described as signal interval Tint. Signal interval Tint corresponds to a period from OFF timing ta1 of first drive signal DS1 to ON timing ta2 of second drive signal DS2. A period to keep drive signals DS1 and DS2 turned ON is described as drive directive period Tj. First drive signal DS1 and second drive signal DS2 may or may not use the same length of drive directive period Tj. Signal interval Tint is comparable to an injection interval.

The energization to flow a drive current corresponding to the drive signal includes first drive energization DI1 and second drive energization DI2. First drive energization DI1 flows a drive current corresponding to first drive signal DS1. Second drive energization DI2 flows a drive current corresponding to second drive signal DS2. The drive current according to drive energization DI1 or DI2 gradually increases up to first drive value Ia based on the ON state of drive signal DS1 or DS2 and is held for a certain period based on first drive value Ia. The drive current decreases down to second drive value Ib smaller than first drive value Ia and is held for a certain period based on second drive value Ib. Subsequently, the drive current gradually decreases based on the OFF state of drive signal DS1 or DS2 and reaches zero. Drive signals DS1 and DS2 include information that changes the drive current to first drive value Ia and second drive value Ib according to drive energizations DI1 and DI2. First drive energization DI1 is comparable to a first energization. Second drive energization DI2 is comparable to a second energization.

Figure 8:
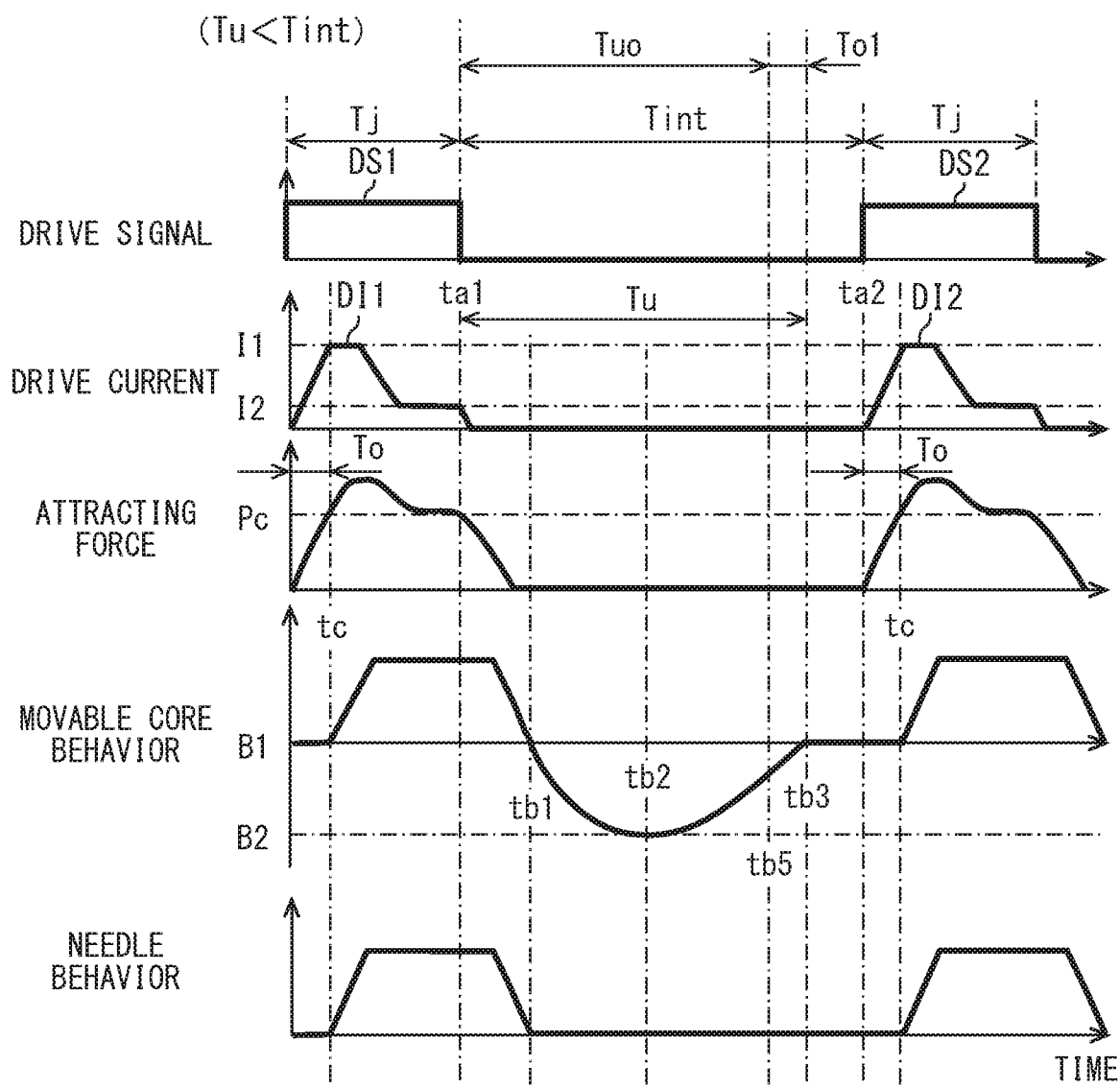
FIG. 8 is a timing chart illustrating a movable core behavior when no erratic injection occurs because a signal interval is longer than a return-to-reference period.

The electromagnetic attracting force caused by drive energization DI1 or DI2 gradually increases with an increase in drive energization DI1 or DI2 and rises to motion enabling value Pc. The movable core 40 starts moving in the valve opening direction when the electromagnetic attracting force reaches motion enabling value Pc. The needle 30 thereby opens the valve to start injecting the fuel. Motion enabling value Pc is set to be able to override the biasing force of the first spring 80. Rise timing tc denotes the timing when the electromagnetic attracting force reaches motion enabling value Pc. Rise period To denotes a period required during the timing to turn ON drive signal DS1 or DS2 and the time when the electromagnetic attracting force reaches motion enabling value Pc. As illustrated in FIG. 8, for example, rise period To applies to second drive signal DS2 from ON timing ta2 to rise timing tc. The present embodiment configures drive signals DS1 and DS2 and drive energizations DI1 and DI2 such that the same rise period To is used for drive signals DS1 and DS2.

Concerning the movable core behavior and the needle behavior in FIGS. 8 through 11, the vertical axis represents the movement amount of the movable core 40 and the needle 30. An increase in the movement amount represents the movement in the valve opening direction. A decrease in the movement amount represents the movement in the valve closing direction.

When drive signal DS1 or DS2 turns OFF, the movable core 40 and the needle 30 accordingly start moving in the valve closing direction and the movable core 40 undershoots. In FIG. 8, the undershooting movable core 40 passes through initial position B1 in the valve closing direction at timing tb1 and reaches most distant position B2 at timing tb2. The movable core 40 thereafter moves in the valve opening direction and returns to initial position B1 at timing tb3. Timing tb3 is described as return-to-reference timing tb3. Return-to-reference period Tu denotes a period from OFF timing ta1 to return-to-reference timing tb3 for first drive signal DS1. Most distant timing tb2 denotes the timing when the movable core 40 reaches most distant position B2.

Start timing tb1 denotes the timing when the movable core 40 starts undershooting. The period from start timing tb1 to return-to-reference timing tb3 corresponds to an undershoot period during which the movable core 40 undershoots.

As illustrated in FIG. 8, return-to-reference timing tb3 occurs earlier than rise period To for the electromagnetic attracting force with respect to second drive signal DS2. In this case, the electromagnetic attracting force is not applied to the undershooting movable core 40. Return-to-reference timing tb3 occurs earlier than ON timing ta2 of second drive signal DS2. Therefore, signal interval Tint is longer than return-to-reference period Tu.

Return-to-reference period Tu includes specific period To1 having the same length as rise period To. Return-to-reference period Tu includes specific timing tb5 between most distant timing tb2 and return-to-reference timing tb3. Specific period To1 corresponds to the period between specific timing tb5 and return-to-reference timing tb3. Return-to-reference period Tu includes allowable period Tuo that is shorter than return-to-reference period Tu by specific period To1. Allowable period Tuo corresponds to the period between OFF timing ta1 of first drive signal DS1 and specific timing tb5 and is shorter than return-to-reference period Tu.

The storage unit 135b stores past information or experiment information, making it possible to estimate return-to-reference timing tb3 or return-to-reference period Tu in terms of undershooting caused by first drive energization DI1. It is also possible to estimate rise period To of the electromagnetic attracting force due to second drive energization DI2. Return-to-reference timing tb3 may also be described as estimated return timing. Return-to-reference period Tu or rise period To may also be described as an estimated return period or an estimated rise period.

Figure 9:
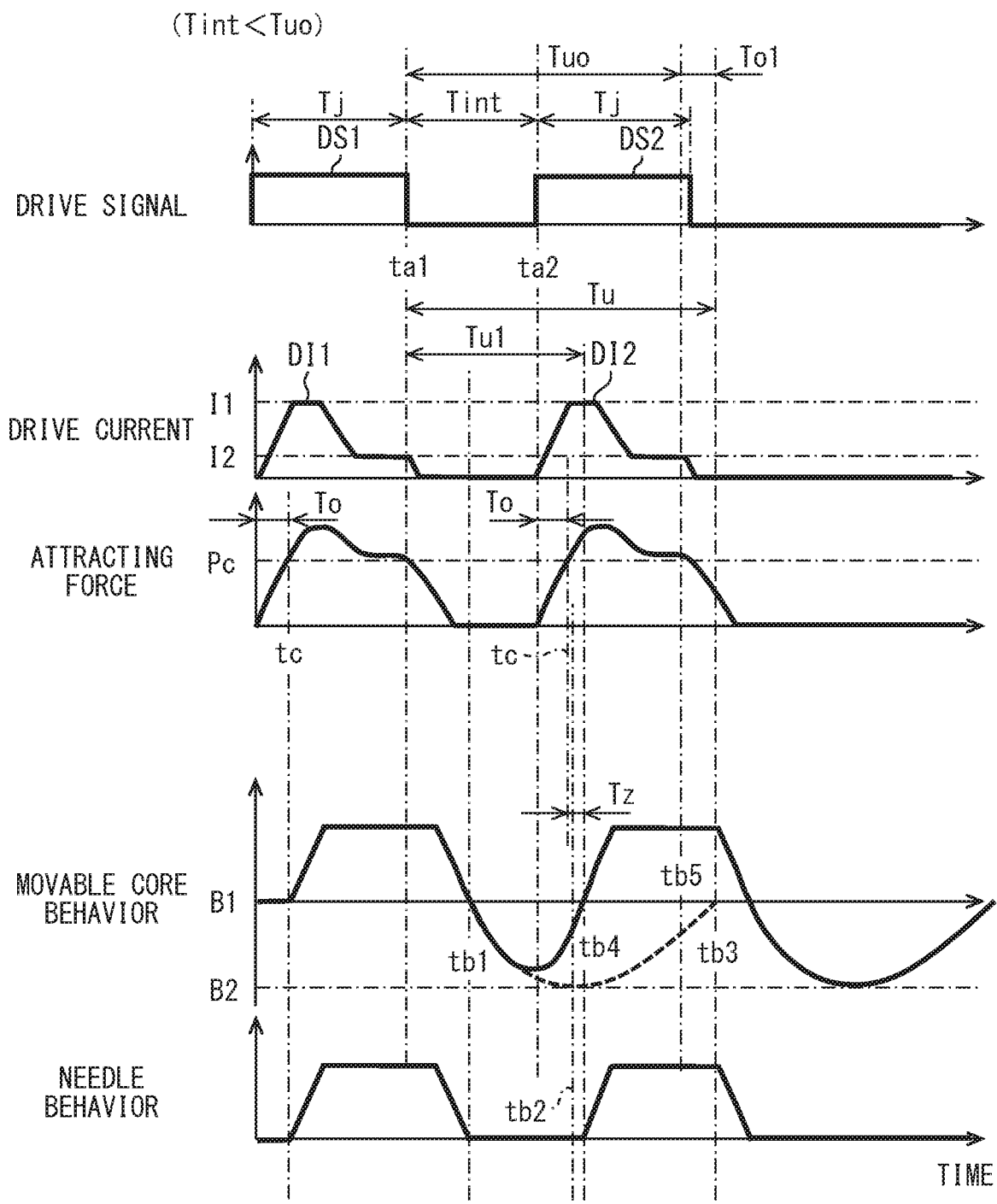
FIG. 9 is a timing chart illustrating a movable core behavior when no erratic injection occurs because a signal interval is shorter than a return-to-reference period.

As illustrated in FIG. 9, when estimated return-to-reference timing tb3 occurs later than rise period To estimated for second drive signal DS2, the electromagnetic attracting force is applied to the undershooting movable core 40 during estimated allowable period Tuo. Return-to-reference timing tb3 occurs later than ON timing ta2 of second drive signal DS2. Therefore, signal interval Tint is shorter than return-to-reference period Tu. Signal interval Tint is shorter than allowable period Tuo.

When return-to-reference timing tb3 occurs later than rise period To, the movable core 40 is forcedly retracted to initial position B1 during allowable period Tuo, shortening the undershoot period. In this case, the movable core 40 returns to initial position B1 at return-to-core timing tb4 earlier than return-to-reference timing tb3. Therefore, the movable core 40 requires return-to-core period Tu1 shorter than return-to-reference period Tu to return to initial position B1 from OFF timing ta1 of first drive signal DS1. Return-to-core period Tu1 is comparable to an additional return period. Return-to-core timing tb4 is comparable to an additional return timing.

The movable core 40 does not return to initial position B1 by rise timing tc even if the undershoot period is shortened during allowable period Tuo. Return-to-core timing tb4 occurs later than rise timing tc. In other words, the electromagnetic attracting force increases to at least motion enabling value Pc at return-to-core timing tb4 when the movable core 40 returns to initial position B1. The movable core 40 returns to initial position B1 to collide with the needle 30. The electromagnetic attracting force larger than or equal to motion enabling value Pc allows the movable core 40 along with the needle 30 to pass through initial position B1 and move to the valve opening side, forcing the needle 30 to open the valve.

Core delay period Tz denotes a period including return-to-core timing tb4 later than rise timing tc. Subsequently, the movable core 40 starts moving in the valve opening direction from initial position B1 after a delay of core delay period Tz. Assuming that drive directive period Tj is constant, the quantity of fuel injected from the injection hole 11 decreases in proportion to core delay period Tz compared to a case of eliminating core delay period Tz.

Figure 10:
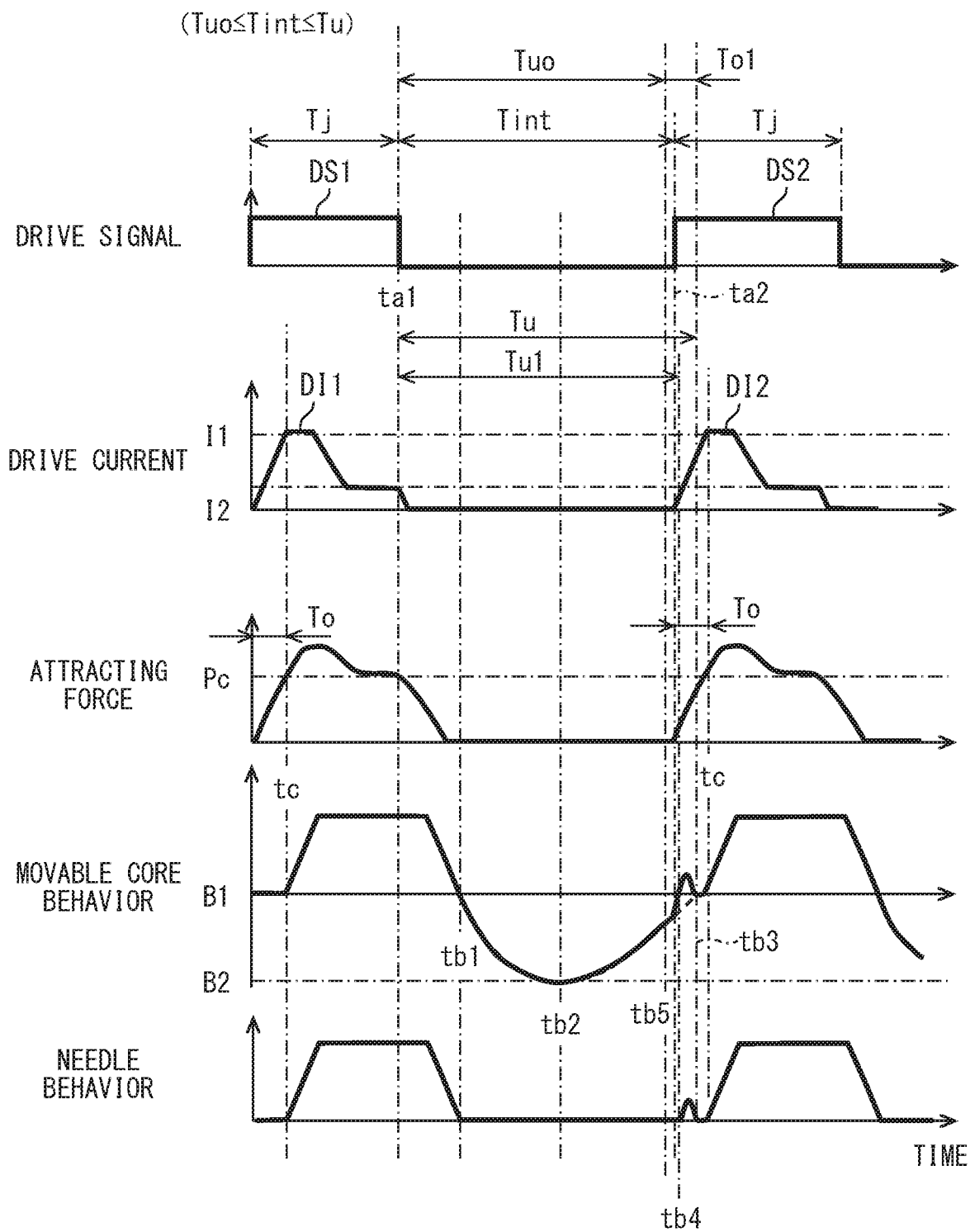
FIG. 10 is a timing chart illustrating a movable core behavior when an erratic injection occurs.

As illustrated in FIG. 10, when return-to-reference timing tb3 is included in rise period To for second drive signal DS2, the electromagnetic attracting force is applied to the undershooting movable core 40 similarly to the case where return-to-reference timing tb3 is included in rise period To. In this case, also, return-to-reference timing tb3 occurs later than ON timing ta2 of second drive signal DS2. Therefore, signal interval Tint is shorter than or equal to return-to-reference period Tu. Meanwhile, signal interval Tint is longer than or equal to allowable period Tuo. The interrelationship of Tuo≤Tint≤Tu is satisfied.

When return-to-reference timing tb3 is included in rise period To, the movable core 40 is forcedly retracted to initial position B1 during specific period To1, shortening the undershoot period. In this case, the movable core 40 returns to initial position B1 at return-to-core timing tb4 earlier than return-to-reference timing tb3 similarly to the case where return-to-reference timing tb3 occurs later than rise period To (see FIG. 9). As a result, return-to-core period Tu1 is shorter than return-to-reference period Tu.

The undershoot period is shortened during specific period To1 because the electromagnetic attracting force is applied to the movable core 40 in the core boost state to accelerate the movable core 40. However, the electromagnetic attracting force applied to the movable core 40 during specific period To1 falls short of motion enabling value Pc and is too small to start moving the movable core 40 staying at initial position B1. The accelerated movable core 40 returns to initial position B1, collides with the needle 30, and temporarily passes through initial position B1 along with the needle 30, and moves to the valve opening side. When the impactive force due to the collision attenuates, however, the movable core 40 again moves to the valve closing side and returns to initial position B1.

Temporary movement of the movable core 40 to the valve opening side instead of initial position B1 is described as an erratic movement. When the movable core 40 causes the erratic movement, the erratic injection occurs, namely, the needle 30 also temporarily opens the valve to accidentally inject the fuel. The inventors found that when return-to-reference timing tb3 is included in rise period To, the erratic movement of the movable core 40 or the erratic injection of the fuel is likely to occur between the fuel injection based on first drive signal DS1 and the fuel injection based on second drive signal DS2.

Figure 11:
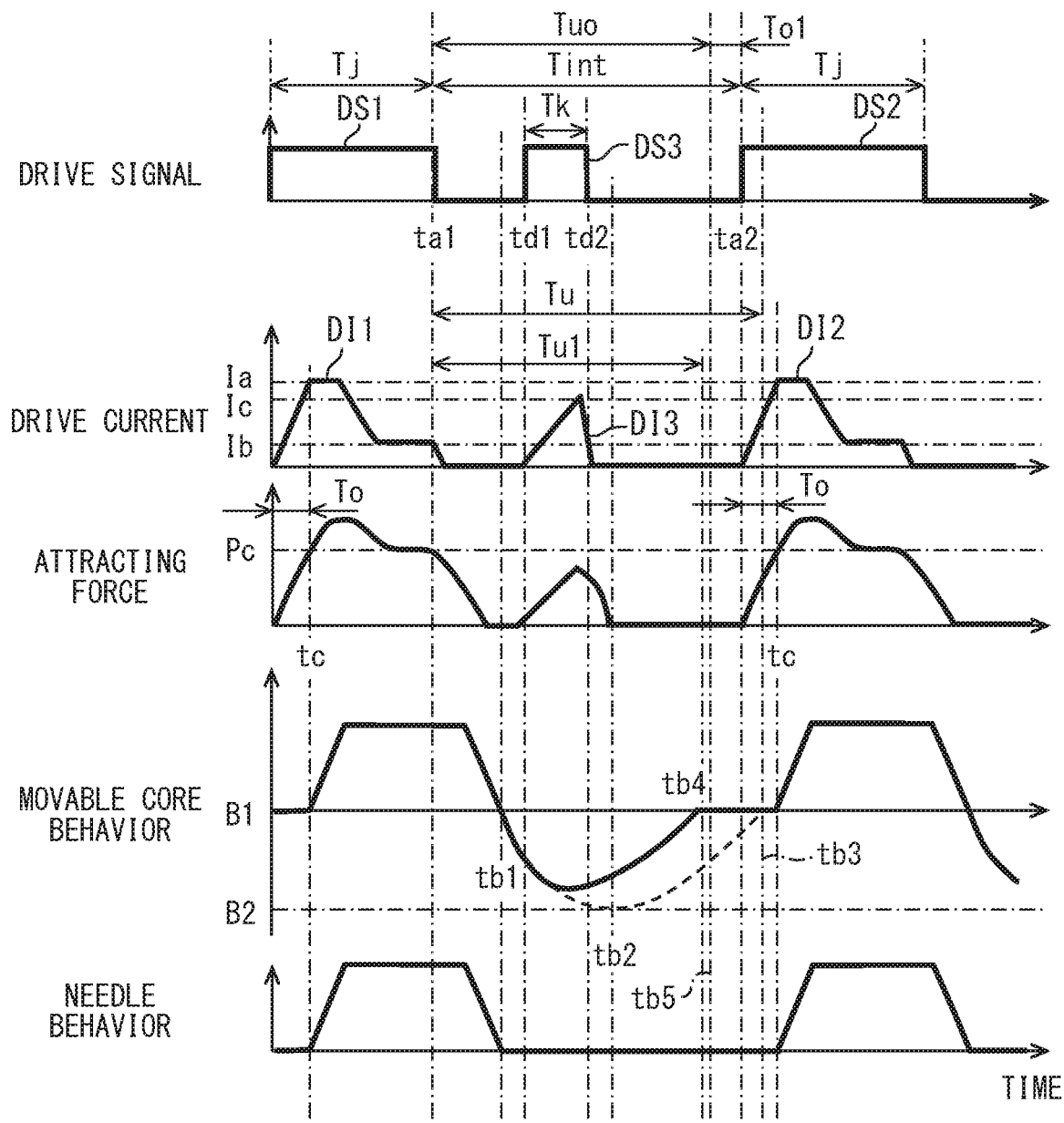
FIG. 11 is a timing chart illustrating a movable core behavior when intermediate driving energization eliminates an erratic injection.

According to the present embodiment, the control unit 135 outputs intermediate drive signal DS3 as a drive signal during allowable period Tuo when specific period To1 includes ON timing ta2 of second drive signal DS2. As illustrated in FIG. 11, intermediate drive signal DS3 turns ON at timing td1 and turns OFF at timing td2 during signal interval Tint. Intermediate directive period Tk denotes a period during which intermediate drive signal DS3 remains ON. Intermediate directive period Tk exists between start timing tb1 and most distant timing tb2 of the undershoot state. In this case, intermediate drive signal DS3 turns ON after the movable core 40 starts undershooting. Intermediate drive signal DS3 turns OFF before the movable core 40 reaches most distant position B2.

The coil 70 is subject to a flow of electric current due to intermediate driving energization DI3 corresponding to intermediate drive signal DS3. When intermediate drive signal DS3 turns ON, the current due to intermediate driving energization DI3 gradually increases up to third drive value Ic. After reaching third drive value Ic, the current gradually decreases to zero. Third drive value Ic is set to be intermediate between first drive value Ia and second drive value Ib. Intermediate drive signal DS3 includes information that changes a drive current based on intermediate driving energization DI3 to third drive value Ic. Intermediate driving energization DI3 is comparable to additional energization. Intermediate driving energization DI3 may be held for a certain period based on third drive value Ic or may gradually decrease after reaching third drive value Ic.

The electromagnetic attracting force generated due to intermediate driving energization DI3 gradually increases with an increase in intermediate driving energization DI3 and gradually decreases with a decrease in intermediate driving energization DI3. This electromagnetic attracting force does not reach motion enabling value Pc unlike the electromagnetic attracting force generated due to drive energization DI1 or DI2. When the electromagnetic attracting force smaller than motion enabling value Pc is applied to the undershooting movable core 40, the movable core 40 is forcedly retracted to initial position B1 to shorten the undershoot period. In this case, the movable core 40 returns to initial position B1 at return-to-core timing tb4 earlier than return-to-reference timing tb3 similarly to the case where intermediate driving energization DI3 is unavailable (see FIG. 10). Return-to-core period Tu1 is shorter than return-to-reference period Tu.

Intermediate directive period Tk and third drive value Ic are configured for intermediate driving energization DI3 such that return-to-core timing tb4 occurs earlier than specific period To1. In this case, the electromagnetic attracting force is not applied to the undershooting movable core 40 similarly to the case where return-to-reference timing tb3 occurs earlier than rise period To for the electromagnetic attracting force concerning second drive signal DS2 (see FIG. 8). It is possible to inhibit the electromagnetic attracting force from causing erratic movement on the movable core 40. In this case, allowable period Tuo includes return-to-core timing tb4. Return-to-core period Tu1 is shorter than allowable period Tuo.

The injection setup process performs an injection setup process that sets an injection mode to inject the fuel from the injector 100. This process will be described with reference to a flowchart in FIG. 12. The control unit 135 performs fuel injection control over the injector 100 by controlling operations of the injector 100 based on the injection mode configured by the injection setup process. The flowchart in FIG. 12 also illustrates a fuel injection control method.

Figure 12:
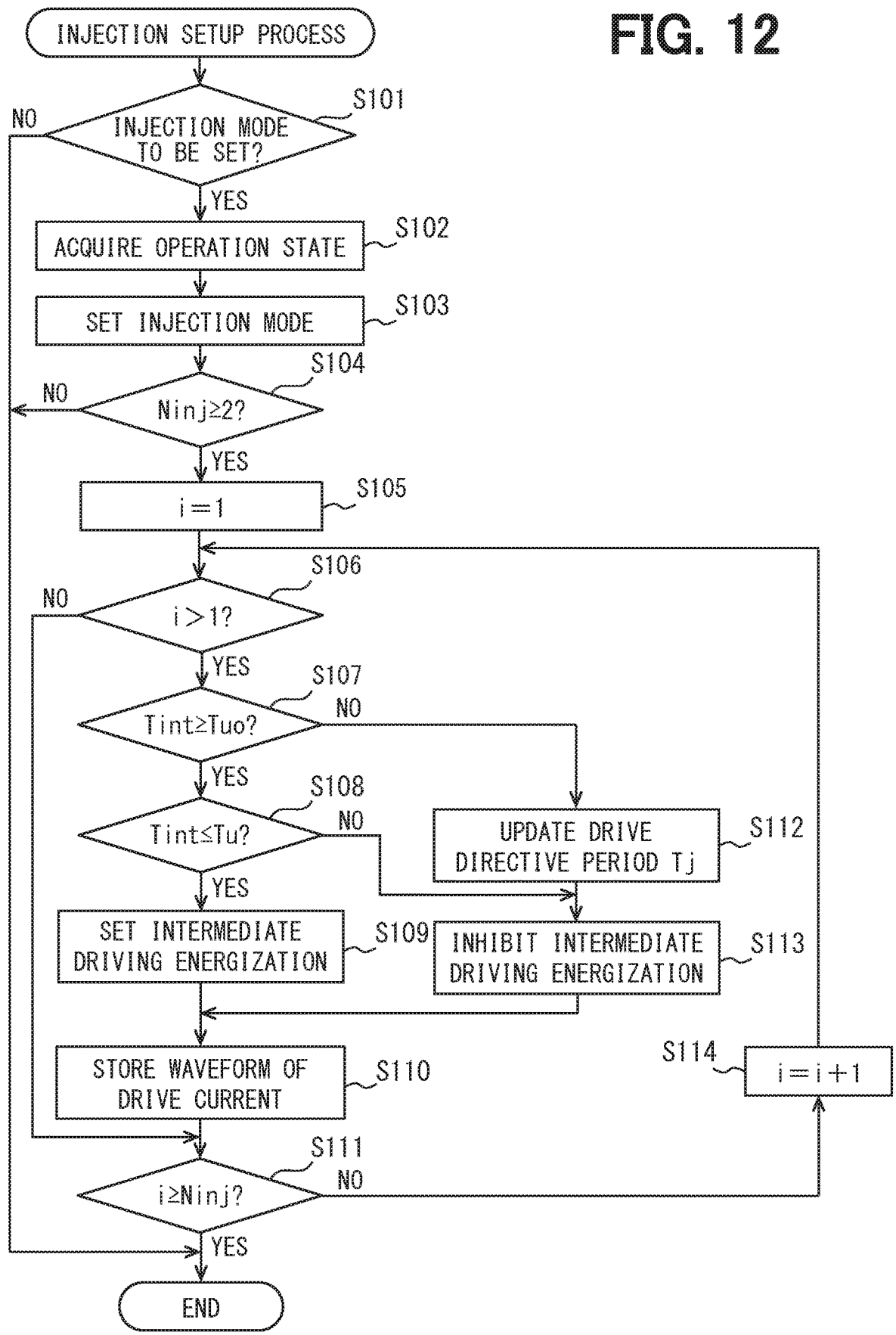
FIG. 12 is a flowchart illustrating an injection setup process.

In step S101 of FIG. 12, the process determines whether to set a fuel injection mode per combustion cycle. If the injection mode is set, the process proceeds to step S102 and acquires an operation state of the internal combustion engine 111. The information acquired to indicate the operation state of the internal combustion engine 111 includes an intake pressure detected based on a detection signal from the intake pressure sensor 123 or an engine speed detected based on a detection signal from the crank angle sensor 124.

In step S103, the process sets the fuel injection mode. The storage unit 135b stores information about the injection mode. The injection mode to be set includes injection quantity Q, drive directive period Tj, time to start injection SOI, time to stop injection EOI, injection pressure Pf, and injection count Ninj. Injection quantity Q provides the total quantity of the fuel injected per combustion cycle. Drive directive period Tj provides a period to keep the drive signal turned ON as above. Time to start injection SOI provides the timing to start the first fuel injection per combustion cycle. Time to stop injection EOI provides the timing to stop the last fuel injection per combustion cycle. Injection pressure Pf provides a pressure of fuel injected from the injector 100. Injection count Ninj provides the number of fuel injections per combustion cycle.

When the injection mode includes injection count Ninj set to be twice or more, signal interval Tint and drive directive period Tj as above are set. Drive values Ia and Ib for the drive current are also set.

In step S104, the process determines whether injection count Ninj indicates twice or more. If injection count Ninj indicates once, the injection setup process terminates directly. If injection count Ninj indicates twice or more, the process identifies the multi-stage injection and proceeds to step S105. If injection count Ninj is set to 1, the injection setup process terminates directly. In step S105, the process sets counter i to "1" to individually identify a plurality of fuel injections.

In steps S106 through S114, the process performs an update process that updates setup contents concerning a drive current for each of the fuel injections in the multi-stage injection. The update process updates the setup contents of the drive current for the ith fuel injection corresponding to counter i. Namely, the update process sets the injection corresponding to the ith shot. In step S106, the update process determines whether counter i is larger than "1." If counter i is not larger than "1," the update process is not performed on the first fuel injection in the multi-stage injection. The process proceeds to step S111. This signifies that the first fuel injection uses the setup contents already set in step S103 for the drive current.

In step S111, the process determines whether counter i reaches injection count Ninj. If counter i reaches injection count Ninj, the process assumes that the update process is performed on all the fuel injections in the multi-stage injection. Subsequently, the injection setup process terminates. If counter i does not reach injection count Ninj, the process proceeds to step S113 and increments counter i by 1. Subsequently, the process returns to step S106. The process in step S106 through S113 is repeatedly performed until counter i reaches injection count Ninj.

If counter i is larger than 1 in step S106, the process assumes that the update process is targeted at the second fuel injection or later in the multi-stage injection. Subsequently, the process proceeds to step S107. In step S107, the process determines whether signal interval Tint is longer than or equal to allowable period Tuo. Here, first drive energization DI1 denotes the energization concerning the fuel injection targeted at the previous process in the multi-stage injection. Second drive energization DI2 denotes the electric current concerning the fuel injection targeted at the present process. The process acquires drive values Ia and Ib, drive directive period Tj, signal interval Tint, and rise period To as parameters for drive energizations DI1 and DI2. The process uses these parameters to calculate allowable period Tuo as an estimated value. The process also acquires rise period To as an estimated value due to second drive energization DI2.

In step S108, the process uses parameters similar to those step S107 to calculate return-to-reference period Tu as an estimated value. The process determines whether signal interval Tint is shorter than or equal to return-to-reference period Tu. If the determinations in steps S107 and S108 are affirmed, the process assumes that the relationship of Tuo≤Tint≤Tu is satisfied as the condition to easily cause an erratic injection as illustrated in FIG. 10. Subsequently, the process proceeds to step S109.

In steps S107 and S108, the process also determines whether return-to-reference timing tb3 is included in rise period To due to second drive energization DI2. If rise period To includes return-to-reference timing tb3, the process proceeds to step S109.

In step S109, the process adds intermediate driving energization DI3 between first drive energization DI1 and second drive energization DI2. The process sets the timing and the energization period of intermediate driving energization DI3 and third drive value Ic such that return-to-core timing tb4 occurs earlier than specific period To1. Namely, the process sets a waveform of the drive current due to intermediate driving energization DI3. To provide the waveform of the drive current, the process also sets mainly ON timing td1, OFF timing td2, and intermediate directive period Tk for intermediate drive signal DS3.

In step S110, the process allows the storage unit 135b to store information about the drive current corresponding to the ith fuel injection. The information mainly includes the waveform of the drive current due to second drive energization DI2 and the waveform of the drive current due to intermediate driving energization D13.

In step S108, if the process determines that signal interval Tint is not shorter than or equal to return-to-reference period Tu, the process assumes that the relationship of Tu<Tint is satisfied as the condition to hardly cause an erratic injection as illustrated in FIG. 8. Subsequently, the process proceeds to step S113 and inhibits the addition of intermediate driving energization DI3. This reliably avoids the condition that the electromagnetic attracting force shortens return-to-reference period Tu to return-to-core period Tu1 and signal interval Tint is longer than or equal to allowable period Tuo and is shorter than or equal to return-to-core period Tu1. Subsequently, the process proceeds to step S110 and allows the storage unit 135b to store the information about the drive current such as the drive current waveform due to second drive energization DI2.

In step S107, if the process determines that signal interval Tint is not longer than or equal to allowable period Tuo, the process assumes that the relationship of Tint<Tuo is satisfied as the condition to hardly cause an erratic injection as illustrated in FIG. 9. Subsequently, the process proceeds to step S112. If Tint<Tuo is satisfied as above, the time during which second drive energization DI2 flows through the coil 70 shortens by core delay period Tz and second drive energization DI2 is likely to accidentally decrease the fuel injection quantity. In step S112, the process updates drive directive period Tj for second drive signal DS2 to correct the energization period for second drive energization DI2. For example, drive directive period Tj is set such that the period during which second drive energization DI2 flows through the coil 70 extends by core delay period Tz.

In step S113, the process inhibits the addition of intermediate driving energization DI3. In step S110, the process allows the storage unit 135b to store the information about the drive current such as the drive current waveform due to updated second drive energization DI2.

The control unit 135 includes a function to perform the steps of the injection setup process. The function to perform the process in step S109 is comparable to an additional energization unit.

According to the present embodiment, intermediate driving energization DI3 is performed when signal interval Tint is longer than or equal to allowable period Tuo and is shorter than or equal to return-to-reference period Tu. In this case, the electromagnetic attracting force forcedly accelerates the movable core 40 in the core boost state, making it possible to cause return-to-core timing tb4 to occur earlier than specific timing tb5. At return-to-core timing tb4, the movable core 40 returns to the initial position. It is possible to prevent the condition of causing an erratic injection, namely, signal interval Tint gets longer than return-to-core period Tu1 and signal interval Tint is accordingly shorter than or equal to return-to-reference period Tu. It is, therefore, possible to inhibit an erratic injection from occurring.

An erratic injection occurs on the condition that signal interval Tint is longer than or equal to allowable period Tuo and is shorter than or equal to return-to-reference period Tu. This condition also signifies that return-to-reference timing tb3 due to first drive energization DI1 is included in rise period To for second drive energization DI2. When intermediate driving energization DI3 is performed, return-to-core timing tb4 occurs earlier than rise period To for second drive energization DI2. Intermediate driving energization DI3 prevents the condition of causing an erratic injection also based on whether return-to-core timing tb4 occurs earlier than rise period To.

According to the present embodiment, intermediate driving energization DI3 is not performed when signal interval Tint is longer than return-to-reference period Tu. When signal interval Tint is longer than return-to-reference period Tu, intermediate driving energization DI3, if performed, shortens return-to-reference period Tu to return-to-core period Tu1. The condition of causing an erratic injection is likely to be satisfied. It is likely to satisfy the condition that signal interval Tint is longer than or equal to allowable period Tuo and is shorter than or equal to return-to-core period Tu1. When signal interval Tint is longer than return-to-reference period Tu, inhibition of intermediate driving energization DI3 accelerates the movable core 40 due to the electromagnetic attracting force. It is possible to reliably avoid the condition of causing an erratic injection.

According to the present embodiment, intermediate driving energization DI3 is not performed when signal interval Tint is shorter than allowable period Tuo. The condition of causing an erratic injection is inapplicable when signal interval Tint is shorter than allowable period Tuo without regard to the degree of the shortness. In this case, intermediate driving energization DI3, if performed, wastes the electricity. Avoidance of intermediate driving energization DI3 can save the energy when signal interval Tint is shorter than allowable period Tuo.

When the condition of causing an erratic injection is satisfied, the present embodiment configures the contents of intermediate driving energization DI3 such that return-to-core timing tb4 occurs earlier than specific period To1. It is possible to avoid a situation where signal interval Tint does not get shorter than allowable period Tuo even though intermediate driving energization DI3 is added. It is possible to more reliably inhibit an erratic injection from occurring.

The state of return-to-core timing tb4 occurring earlier than specific period To1 signifies that return-to-core timing tb4 occurs earlier than rise period To due to second drive energization DI2. When intermediate driving energization DI3 is performed such that return-to-core timing tb4 occurs earlier than rise period To, the configuration enables to prevent the condition of causing an erratic injection also based on whether return-to-core timing tb4 occurs earlier than rise period To.

According to the present embodiment, intermediate driving energization DI3 starts at the timing before the undershooting movable core 40 reaches most distant position B2. The electromagnetic attracting force is applied to the movable core 40 at the timing earlier than most distant timing tb2, facilitating the transition to the state of making return-to-core period Tu1 shorter than signal interval Tint. Therefore, the configuration enables to easily avoid the erratic condition that signal interval Tint is shorter than or equal to return-to-core period Tu1. Unlike the present embodiment, when intermediate driving energization DI3 starts at the timing later than most distant timing tb2, return-to-core period Tu1 is highly unlikely to be shorter than signal interval Tint even if the electromagnetic attracting force accelerates the movable core 40 in the core boot state.

According to the present embodiment, intermediate driving energization DI3 starts after the movable core 40 starts undershooting. It is possible to avoid the situation where the electromagnetic attracting force is applied to the movable core 40 while the needle 30 is closing the valve. When the electromagnetic attracting force is applied to the movable core 40 at the timing earlier than start timing tb1 for the undershooting, the electromagnetic attracting force is likely to prevent the movement of the movable core 40 going to return to initial position B1 in synchronization with the valve closing operation of the needle 30. In this case, the movable core 40 stops moving in the valve closing direction or decreases the movement speed. The consequence is to stop the valve closing operation of the needle 30 or to easily extend the time required for the valve closing operation. Meanwhile, the present embodiment performs intermediate driving energization DI3 at the timing that does not hinder the valve closing operation of the needle 30. Therefore, the configuration enables to appropriately perform the valve closing operation of the needle 30 based on first drive energization DI1 and concurrently inhibit an erratic fuel injection from occurring due to second drive energization DI2.

Second Embodiment

The first embodiment avoids the condition of causing an erratic injection by adding intermediate driving energization DI3. Meanwhile, a second embodiment avoids the condition of causing an erratic injection by shortening rise period To of the electromagnetic attracting force due to second drive energization DI2.

The control unit 135 can select between normal energization DIa and shortened energization DIb. Normal energization DIa does not shorten rise period To. Shortened energization DIb shortens rise period To. A current gradient denotes the degree of increase in the drive current that increases with the start of second drive energization DI2. Shortened gradient Sb represents the current gradient concerning shortened energization DIb. Normal gradient Sa represents the current gradient concerning normal energization DIa. Shortened gradient Sb is larger than normal gradient Sa.

The current gradient is expressed as a ratio of $\Delta$Ip to $\Delta$tp, where $\Delta$Ip denotes the change quantity until the drive current reaches the maximum value and $\Delta$tp denotes required period needed until the drive current reaches the maximum value.

Figure 13:
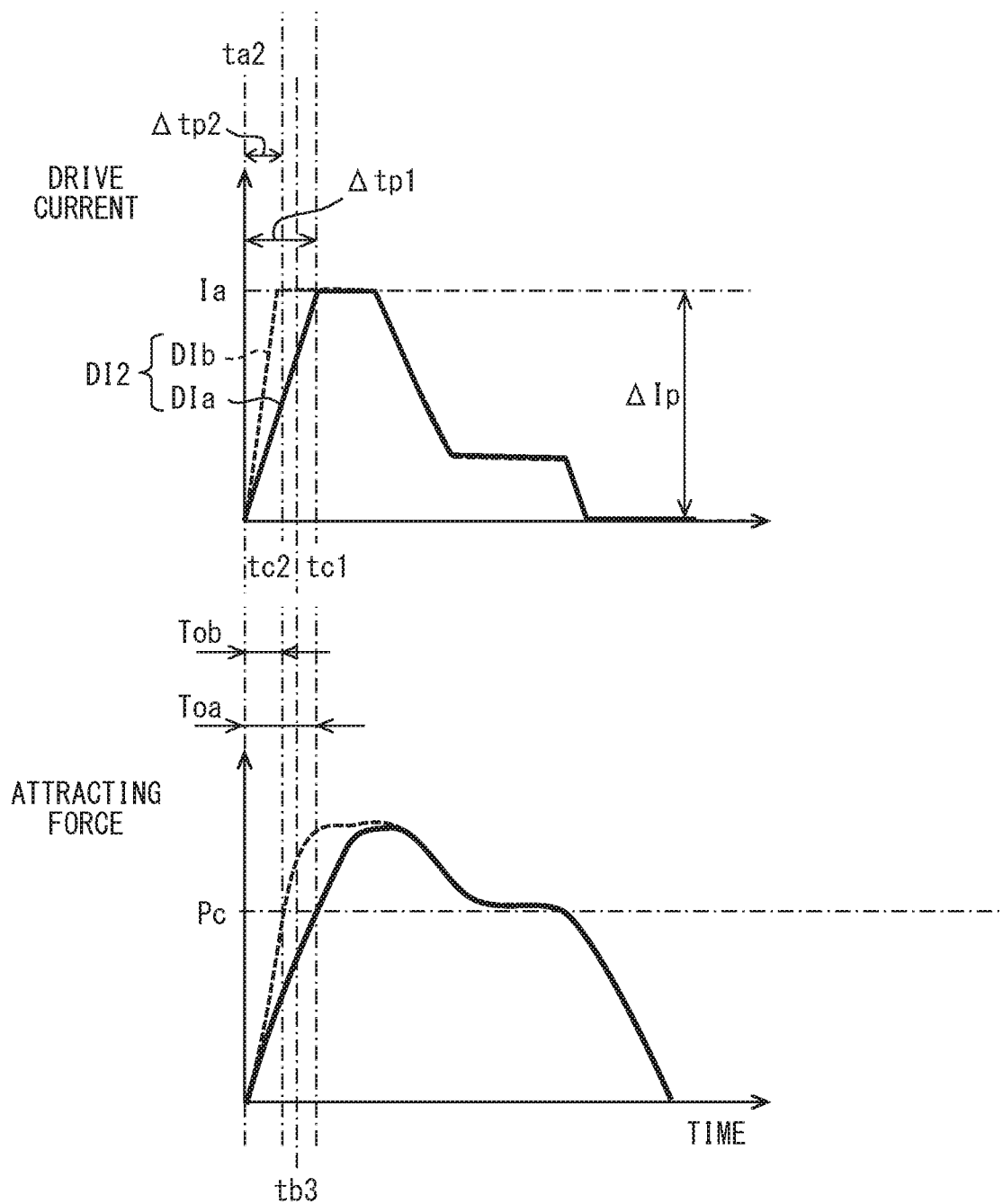
FIG. 13 is a timing chart illustrating an aspect of change in a driving current according to a second embodiment.

In FIG. 13, normal energization DIa and shortened energization DIb indicate the same change quantity $\Delta$Ip. Shortened energization DIb indicates shorter required period $\Delta$tp than that of normal energization DIa. It is supposed that required period $\Delta$tp for normal energization DIa is described as normal required period $\Delta$tp1 and required period $\Delta$tp for shortened energization DIb is described as shortened required period $\Delta$tp2. Subsequently, shortened required period $\Delta$tp2 is shorter than normal required period $\Delta$tp1. The relationship expressed as $\Delta$Ip/$\Delta$tp2>$\Delta$Ip/$\Delta$tp1 is satisfied. Normal energization DIa and shortened energization DIb use first drive value Ia as the maximum value of drive current. Change quantity $\Delta$Ip equals first drive value Ia.

As illustrated in FIG. 13, normal energization DIa allows the electromagnetic attracting force to reach motion enabling value Pc at normal rise timing tc1. A period required for the reach is described as normal rise period Toa. Meanwhile, shortened energization DIb allows the electromagnetic attracting force to reach motion enabling value Pc at shortened rise timing tc2 earlier than normal rise timing tc1. A period required for the reach is described as shortened rise period Tob. In this case, shortened rise period Tob is shorter than normal rise period Toa.

In FIG. 13, normal energization DIa allows the drive current to reach first drive value Ia at the timing that haphazardly coincides with normal rise timing tc1. However, these timings may differ from each other. Similarly, shortened energization DIb allows the drive current to reach first drive value Ia at the timing that haphazardly coincides with shortened rise timing tc2. However, these timings may differ from each other.

In the injector 100, an increase in the voltage applied to the coil 70 shortens rise period To. The control unit 135 selects the voltage applied to the coil 70 to select normal energization DIa and shortened energization DIb. The drive signal includes the information about the voltage applied to the coil 70.

In terms of second drive energization DI2, the undershooting movable core 40 is expected to return to initial position B1 at return-to-reference timing tb3 that is supposed to belong to normal rise period Toa and not to belong to shortened rise period Tob. In terms of normal energization DIa, normal rise period Toa includes return-to-reference timing tb3, validating the condition of Tuo≤Tint≤Tu to cause an erratic injection. In terms of shortened energization DIb, shortened rise period Tob does not include return-to-reference timing tb3, invalidating the condition of Tuo≤Tint≤Tu to cause an erratic injection. Selection of shortened energization DIb instead of normal energization DIa as second drive energization DI2 shortens rise period To, making it possible to avoid the condition of Tuo≤Tint≤Tu to cause an erratic injection.

The control unit 135 performs an injection setup process similar to the first embodiment. However, the present embodiment performs steps S201 and S202 instead of steps S109 and S113 in the first embodiment.

Figure 14:
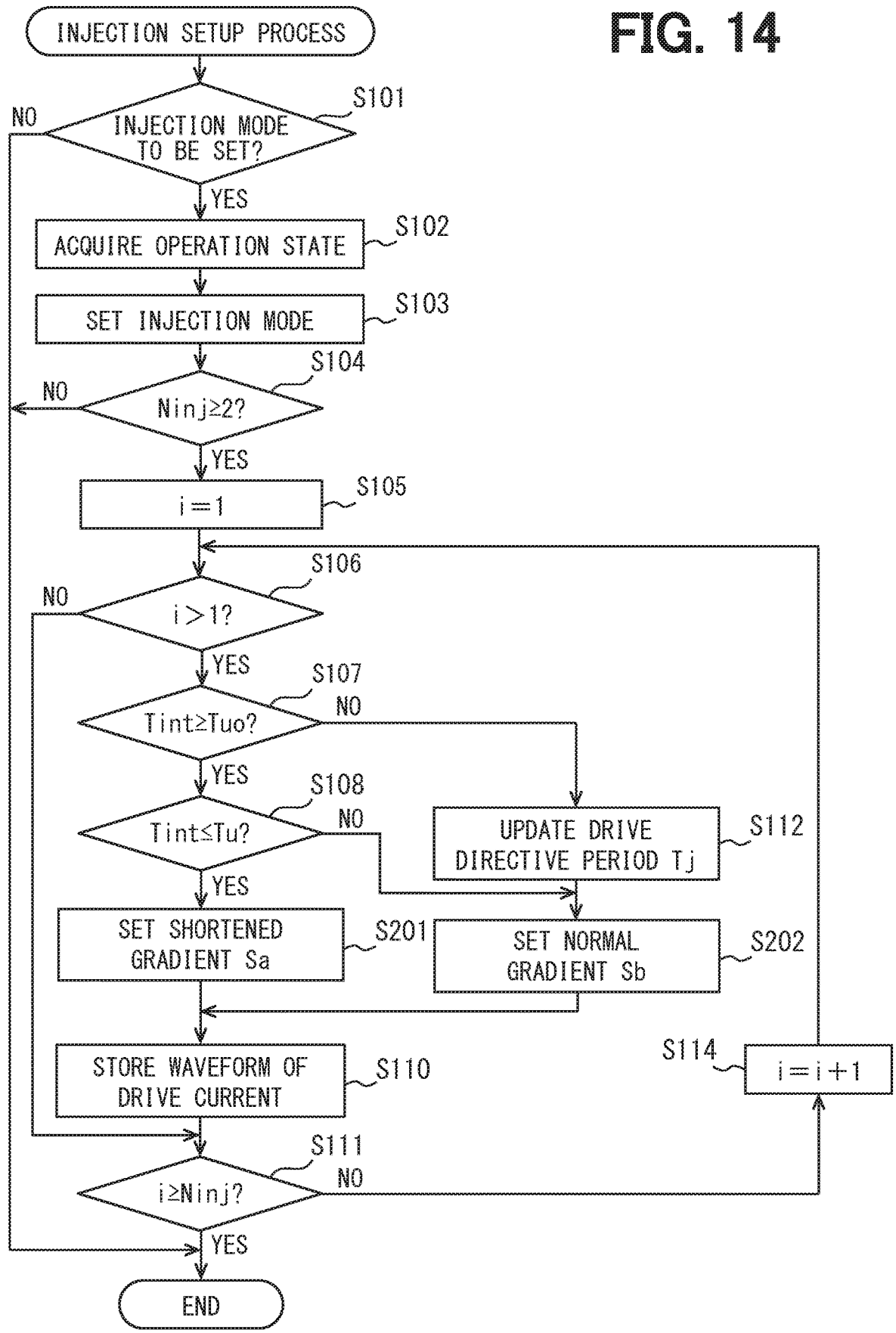
FIG. 14 is a flowchart illustrating an injection setup process.

According to a flowchart in FIG. 14, if the process in steps S107 and S108 determines the validity of the condition of Tuo≤Tint≤Tu to cause an erratic injection, the process proceeds to step S201. In step S201, the process selects shortened energization DIb as second drive energization DI2 to set shortened gradient Sb. Namely, the process sets the drive current waveform due to second drive energization DI2. In this case, the selection of shortened gradient Sb instead of normal gradient Sa can decrease the possibility of including return-to-reference timing tb3 in shortened rise period Tob. The function to perform the process in step S201 is comparable to a changing energization portion.

After S201, the process proceeds to step S110 and allows the storage unit 135*b* to store information about the drive current waveform due to second drive energization DI2 corresponding to the ith fuel injection. The information mainly includes shortened gradient Sb of the drive current due to shortened energization DIb.

If the condition of Tuo≤Tint≤Tu to cause an erratic injection is invalid. Subsequently, the process proceeds to step S202. In step S202, the process selects normal energization DIa as second drive energization DI2 to set normal gradient Sa. Comparing the selection of normal energization DIa with the selection of shortened energization DIb, the selection of shortened energization DIb easily increases the power consumption mainly because the voltage applied to the coil 70 increases. Therefore, the selection of normal energization DIa can save energy when the condition of causing an erratic injection is invalid.

After S202, the process also proceeds to step S110 and allows the storage unit 135*b* to store information about the drive current waveform due to second drive energization DI2 corresponding to the ith fuel injection. This time, the information mainly includes normal gradient Sa of the drive current due to normal energization DIa.

According to the present embodiment, shortened rise period Tob is shorter than normal rise period Toa when shortened energization DIb is selected as second drive energization DI2. Namely, the current gradient due to second drive energization DI2 is larger than the current gradient due to first drive energization DI1. Therefore, the configuration enables to decrease the possibility of including return-to-reference timing tb3 in shortened rise period Tob. The selection of shortened rise period Tob shortens rise period To and extends allowable period Tuo. It is possible to easily avoid the condition of causing an erratic injection, namely, signal interval Tint is longer than or equal to allowable period Tuo. When the condition of causing an erratic injection is invalid, normal energization DIa is selected as second drive energization DI2, making it possible to save energy.

Shortened gradient Sb is larger than normal gradient Sa. Therefore, an increase rate of the electromagnetic attracting force occurring due to shortened energization DIb is larger than an increase rate of the electromagnetic attracting force occurring due to normal energization DIa. Even if shortened rise period Tob does not include return-to-reference timing tb3, the electromagnetic attracting force drastically increases before and after return-to-reference timing tb3 and can move the movable core 40 in the valve opening direction against the biasing force of the first spring 80. The movable core 40 is hardly subject to the erratic movement that causes the movable core 40 in the core boost state to pass through initial position B1 in the valve opening direction, move in the valve closing direction due to the biasing force of the first spring 80, and return to initial position B1. Namely, the configuration enables to inhibit an erratic injection of the fuel.

Figure 15:
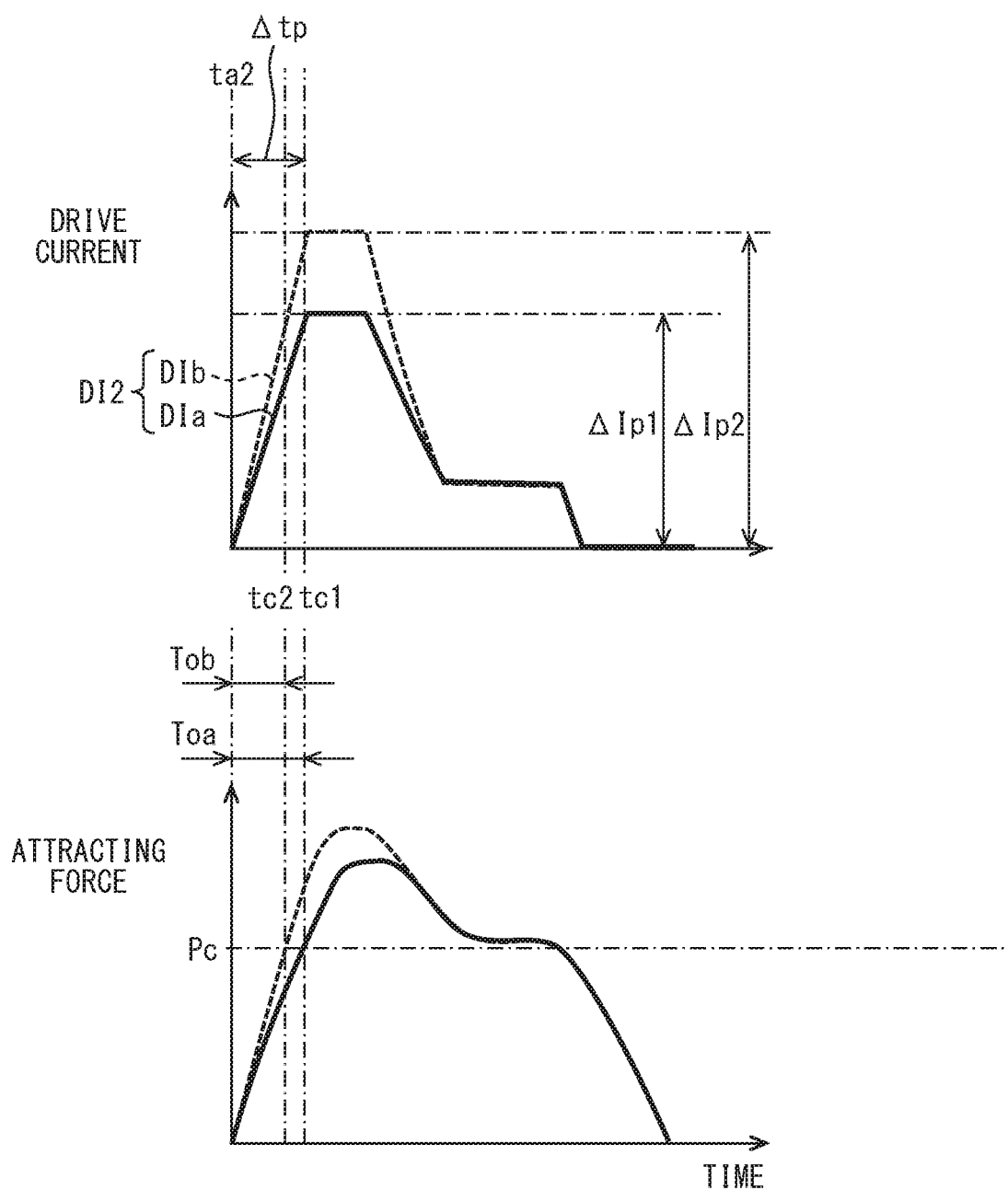
FIG. 15 is a timing chart illustrating an aspect of change in another driving current.

FIG. 15 illustrates a configuration in which shortened gradient Sb is larger than normal gradient Sa. According to this configuration, the same required period Δtp applies to normal energization DIa and shortened energization DIb and shortened energization DIb indicates larger change quantity Δlp than that of normal energization DIa. Concerning this configuration, change quantity Δlp of normal energization DIa is described as normal change quantity Δlp1 and change quantity Δlp of shortened energization DIb is described as shortened change quantity Δlp2. Subsequently, shortened change quantity Δlp2 is larger than normal change quantity Δlp1. In this case, also, the relationship expressed as Δlp/Δtp2>Δlp/Δtp1 is satisfied. Shortened rise period Tob is shorter than normal rise period Toa. The selection of shortened energization DIb as second drive energization DI2 enables to avoid the condition of causing an erratic injection. In FIG. 15, the first drive value of normal energization DIa corresponds to normal change quantity Δlp1 and the first drive value of shortened energization DIb corresponds to shortened change quantity Δlp2.

Normal energization DIa and shortened energization DIb may use different required period Δtp or change quantity Δlp only on the fulfillment of the condition that shortened gradient Sb is larger than normal gradient Sa.

Third Embodiment

Figure 16:
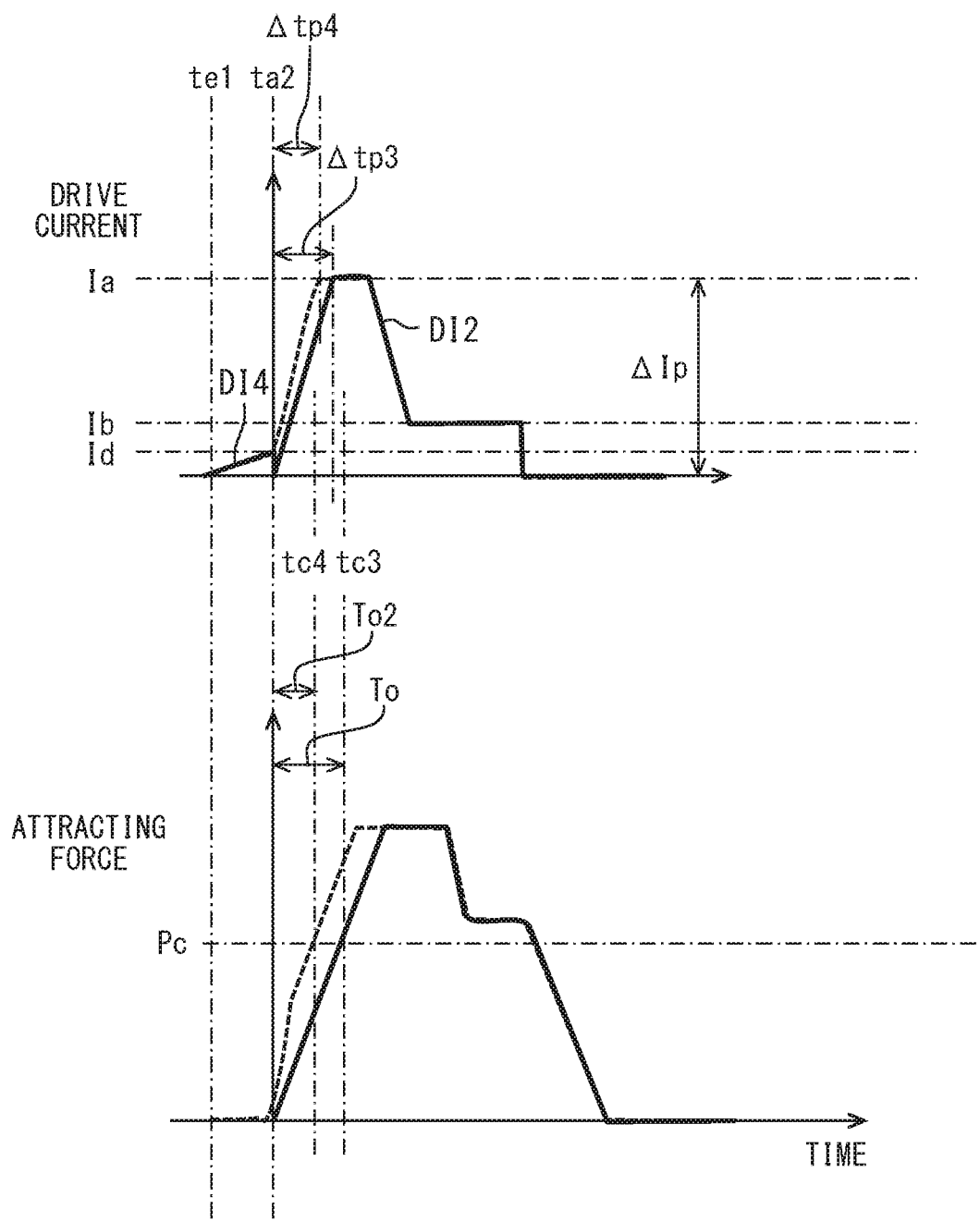
FIG. 16 is a timing chart illustrating an aspect of change in a driving current according to a third embodiment.

The above-mentioned first embodiment avoids the condition of causing an erratic injection by adding intermediate driving energization DI3. However, a third embodiment avoids the condition of causing an erratic injection by adding a pre-driving energization instead of intermediate driving energization DI3. As illustrated in FIG. 16, pre-driving energization DI4 starts at pre-timing te1 before the start of second drive energization DI2. Second drive energization DI2 starts continuously without interruption of pre-driving energization DI4. In this case, pre-driving energization DI4 changes to second drive energization DI2 at ON timing ta2 for second drive signal DS2.

The drive current due to pre-driving energization DI4 gradually increases from zero and reaches the maximum value at ON timing ta2 for second drive signal DS2. When this maximum value is described as fourth drive value Id, fourth drive value Id is smaller than second drive value Ib. Pre-driving energization DI4 is comparable to a pre-energization. Pre-driving energization DI4 may be described as a pre-charge.

When pre-driving energization DI4 is performed, the drive current reaches first drive value Ia at an early timing compared to a case where pre-driving energization DI4 is not performed because the drive current already reaches fourth drive value Id at ON timing ta2 for second drive signal DS2. Similarly to the second embodiment, it is assumed to use the current gradient, change quantity Δlp, and required period Δtp. When pre-driving energization DI4 is not performed, gradient without pre-driving energization Sc denotes a ratio of required period without pre-driving energization Δtp3 to change quantity Δlp. When pre-driving energization DI4 is performed, gradient with pre-driving energization Sd denotes a ratio of required period with pre-driving energization Δtp4 to change quantity Δlp and is larger than gradient without pre-driving energization Sc. Namely, required period with pre-driving energization Δtp4 is shorter than required period without pre-driving energization Δtp3.

When pre-driving energization DI4 is unavailable, the electromagnetic attracting force reaches motion enabling value Pc at timing tc3. When pre-driving energization DI4 is available, the electromagnetic attracting force reaches motion enabling value Pc at timing tc4 earlier than timing tc3. When pre-driving energization DI4 is available, pre-rise period To2 required for the electromagnetic attracting force to reach motion enabling value Pc is shorter than rise period To applicable to the case where pre-driving energization DI4 is unavailable. When pre-driving energization DI4 is available, the drive current and the electromagnetic attracting force both indicate particularly large increase rates immediately after second drive signal DS2 turns ON. Thereafter, the increase rates slightly decrease.

Figure 17:
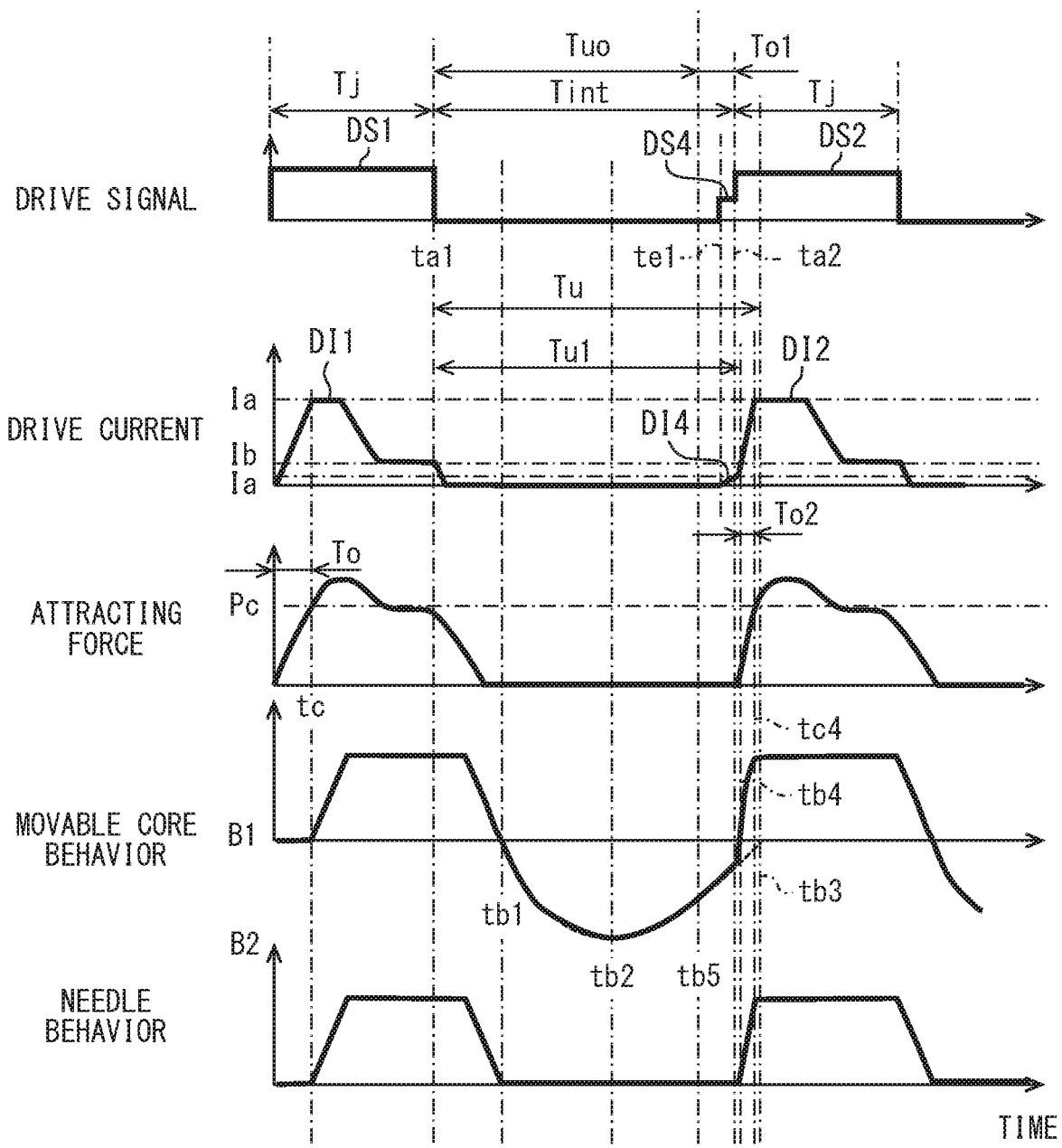
FIG. 17 is a timing chart illustrating a movable core behavior when pre-driving energization eliminates an erratic injection.

It is supposed that the condition of Tuo≤Tint≤Tu to cause an erratic injection is valid because rise period To as the reference includes return-to-reference timing tb3. In this case, as illustrated in FIG. 17, pre-drive signal DS4 turns ON to perform pre-driving energization DI4. Pre-drive signal DS4 turns ON during a period between specific timing tb5 and ON timing ta2 for second drive signal DS2 and, without turning OFF, straight succeeds to second drive signal DS2. Pre-drive signal DS4 includes information mainly about the maximum value of the drive current due to pre-driving energization DI4.

When the condition of Tuo≤Tint≤Tu to cause an erratic injection is valid as illustrated in FIG. 17, the present embodiment performs pre-driving energization DI4 to shorten rise period To for second drive energization DI2 to rise period To2. In this case, the electromagnetic attracting force increases the increase rate as above. The movable core 40 hardly causes an erratic movement due to the electromagnetic attracting force drastically increased before and after return-to-core timing tb4 even if return-to-core timing tb4 is included in pre-rise period To2. The movable core 40 in the core boost state is accelerated by the electromagnetic attracting force and passes through initial position B1. Subsequently, the electromagnetic attracting force acts against the first spring 80. Therefore, the movable core 40 continues moving in the valve opening direction without returning to initial position B1.

The control unit 135 performs an injection setup process similar to the first embodiment. However, the present embodiment performs steps S301 and S302 instead of steps S109 and S113 in the first embodiment.

Figure 18:
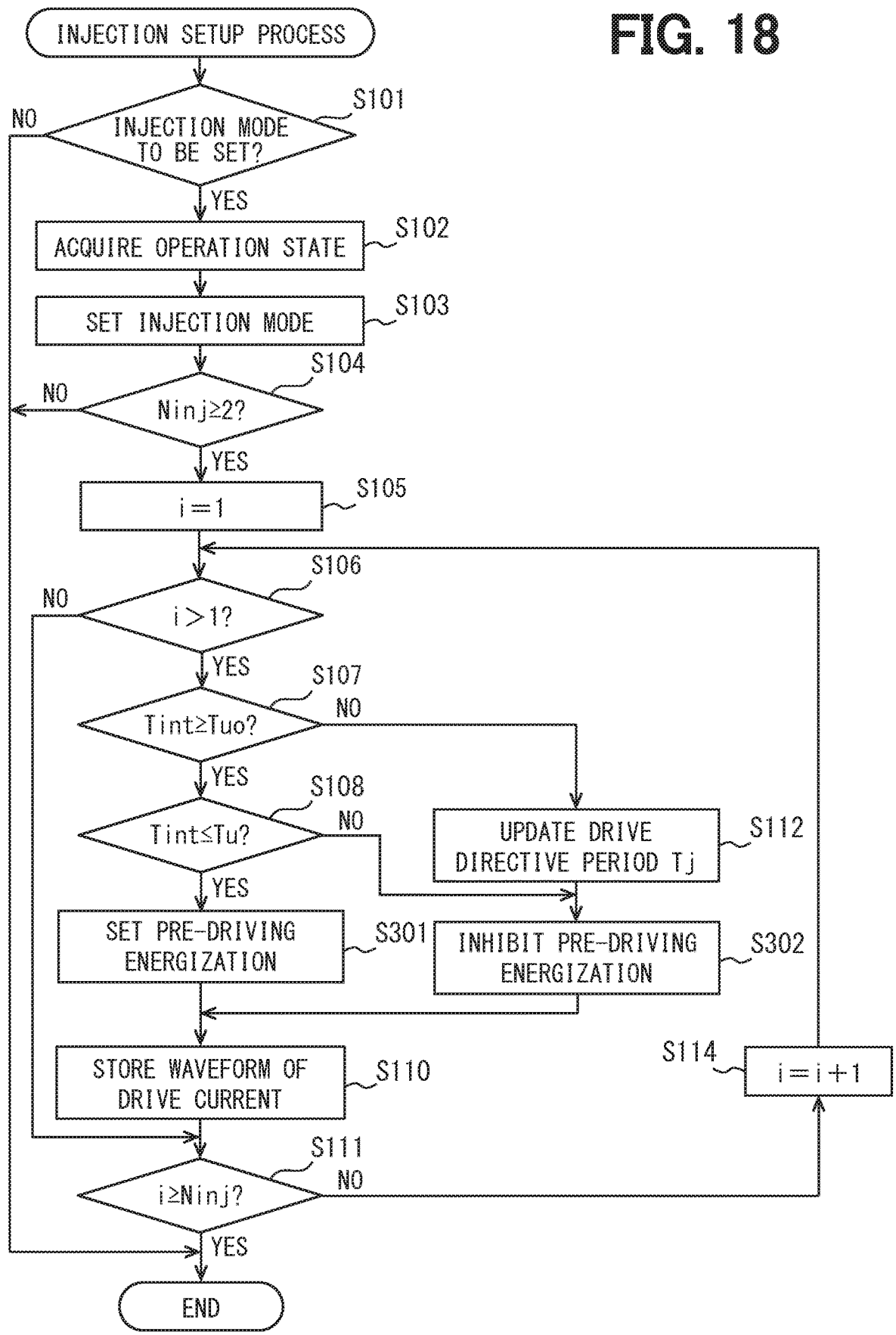
FIG. 18 is a flowchart illustrating an injection setup process.

According to a flowchart in FIG. 18, if the process in steps S107 and S108 determines the validity of the condition of Tuo≤Tint≤Tu to cause an erratic injection, the process proceeds to step S301. In step S301, the process adds pre-driving energization DI4 before second drive energization DI2. The process mainly sets the pre-timing and fourth drive value Id for pre-driving energization DI4 to prevent the electromagnetic attracting force from occurring at the timing earlier than ON timing ta2 for second drive signal DS2. Namely, the process sets a drive current waveform due to pre-driving energization DI4. The function to perform the process in step S301 is comparable to a pre-energization portion.

After S301, the process proceeds to step S110 and allows the storage unit 135b to store information about the drive current waveform due to second drive energization DI2 corresponding to the ith fuel injection. The information mainly includes gradient with pre-driving energization Sd.

If the condition of Tuo≤Tint≤Tu to cause an erratic injection is invalid, the process proceeds to step S302 and inhibits the setting of pre-driving energization DI4. Addition of pre-driving energization DI4 increases the power consumption compared to the case of not adding pre-driving energization DI4. Therefore, the inhibition of the setting of pre-driving energization DI4 can save energy.

After S302, the process also proceeds to step S110 and allows the storage unit 135b to store information about the drive current waveform due to second drive energization DI2 corresponding to the ith fuel injection. The information mainly includes gradient without pre-driving energization Sc.

When pre-driving energization DI4 is added before second drive energization DI2, the present embodiment increases the increase rate of the electromagnetic attracting force due to second drive energization DI2. The movable core 40 hardly causes an erratic movement. In this case, the addition of pre-driving energization DI4 shortens rise period To to pre-rise period To2, making it possible to decrease the possibility of including return-to-core timing tb4 in pre-rise period To2. Therefore, the configuration enables to inhibit an erratic injection of fuel.

Other Embodiments

While there have been described specific embodiments of the present disclosure, the disclosure should not be understood exclusively in terms of the above-mentioned embodiments but may be applicable to various embodiments and combinations within the spirit and scope of the disclosure.

As a first modification, return-to-reference period Tu and allowable period Tuo may not start from OFF timing ta1 of first drive signal DS1. For example, return-to-reference period Tu and allowable period Tuo may start from start timing tb1 for undershooting or the timing when the drive current due to first drive signal DS1 goes zero. Return-to-reference period Tu and allowable period Tuo just need to start from the same timing earlier than specific timing tb5.

As a second modification, rise period To for the electromagnetic attracting force may differ depending on first drive energization DI1 and second drive energization DI2. Even in this case, return-to-reference timing tb3 or return-to-core timing tb4 is included in rise period To for the electromagnetic attracting force due to second drive energization DI2, validating the condition of Tuo≤Tint≤Tu to cause an erratic injection.

The above-mentioned embodiments use a restoring force of the stretching second spring 90 to provide the undershooting movable core 40 with the core boost operation toward initial position B1. However, a third modification may provide the core boost operation by using a restoring force of the compressed second spring 90. The second spring 90 may be excluded. Even in this case, for example, the movable core 40 can bounce off the stepped surface 211 of the housing 20 to provide the core boost toward initial position B1.

According to the first embodiment, third drive value Ic due to intermediate driving energization DI3 is smaller than first drive value Ia and larger than second drive value Ib. As a fourth modification, third drive value Ic may be larger than first drive value Ia or smaller than second drive value Ib. Third drive value Ic just needs to be able to avoid the condition of Tuo≤Tint≤Tu to cause an erratic injection by addition of intermediate driving energization DI3.

According to the first embodiment, the electromagnetic attracting force due to intermediate driving energization DI3 uses the maximum value set to be smaller than motion enabling value Pc. As a fifth modification, the maximum value may be larger than motion enabling value Pc. In this case, also, the maximum value just needs to be provided for the electromagnetic attracting force due to intermediate driving energization DI3 to be able to avoid the condition of Tuo≤Tint≤Tu to cause an erratic injection.

According to the first embodiment, intermediate directive period Tk for intermediate driving energization DI3 terminates at the timing earlier than most distant timing tb2. As a sixth modification, intermediate directive period Tk may be placed after most distant timing tb2. In this case, also, the timing or the length of intermediate directive period Tk just needs to be provided to be able to avoid the condition of Tuo≤Tint≤Tu to cause an erratic injection by addition of intermediate driving energization DI3.

A seventh modification may add intermediate driving energization DI3 even when the condition of causing an erratic injection is invalid according to the first embodiment. For example, signal interval Tint may be longer than return-to-reference period Tu or signal interval Tint may be shorter than allowable period Tuo. In such a case, intermediate driving energization DI3 may be added between first drive energization DI1 and second drive energization DI2.

As an eighth modification, the current gradient due to second drive energization DI2 may be larger than the current gradient due to first drive energization DI1 when the condition of Tuo≤Tint≤Tu to cause an erratic injection is valid according to the second embodiment. For example, the current gradient due to the present drive energization is made larger than the current gradient due to the previous drive energization and then the current gradient due to the next drive energization is made larger than the present drive energization. This configuration gradually increases the current gradient by repeatedly performing the drive energization for fuel injection. Therefore, an increase in the number of drive energizations for fuel injection can reliably suppress an occurrence of the erratic injection.

The third embodiment sets fourth drive value Id due to pre-driving energization DI4 to be smaller than second drive value Ib. As a ninth modification, however, fourth drive value Id may be larger than second drive value Ib. Fourth drive value Id is larger than first drive value Ia or third drive value Ic. Fourth drive value Id is favorably set to be an appropriate size such that the electromagnetic attracting force does not get too large at the timing earlier than start timing tb1 for second drive signal DS2.

As a tenth modification, pre-timing te1 to start pre-driving energization DI4 according to the third embodiment may be earlier than specific timing tb5. In this case, also, fourth drive value Id is favorably set to be an appropriate size such that the electromagnetic attracting force does not get too large at the timing earlier than start timing tb1 for second drive signal DS2.

According to the above-mentioned embodiments, the control unit 135 performs the injection setup process. As an eleventh modification, the ECU 125 may perform the injection setup process. In this case, the ECU 125 is comparable to a fuel injection control device. The control unit 135 may include some of the functions to perform the injection setup process. The ECU 125 may include the remaining functions. In this case, the control unit 135 and the ECU 125 fulfill the function as the fuel injection control device in conjunction with a plurality of arithmetic devices. Various programs may be stored in a non-transitory tangible storage medium such as flash memory or a hard disk provided for each arithmetic device.

As a twelfth modification, the ECU 125 or the control unit 135 may include a dedicated electric circuit including at least one integrated circuit or passive device. If the control unit 135 includes a plurality of dedicated electric circuit portions, the additional energization unit as the function to perform the process in step S109 includes at least one dedicated electric circuit portion, for example.

The present disclosure has been described with reference to the embodiments but is not limited to the embodiments and structures. The present disclosure covers various modification examples and modifications within a commensurate scope. In addition, the category or the scope of the idea of the present disclosure covers various combinations or forms and moreover the other combinations or forms including only one element or more or less in the former.

The invention claimed is:

1. A fuel injection control device for a fuel injection valve, the fuel injection valve including:
   an injection hole to inject fuel;
   a valve body configured to move in a valve opening direction to open the injection hole;
   a fixed core configured to generate an electromagnetic attracting force on energization of a coil;
   a movable core configured to move from a specified initial position in the valve opening direction relative to the valve body when attracted by the fixed core to move the valve body in the valve opening direction; and
   a valve body biasing member that biases the valve body in a valve closing direction opposite to the valve opening direction, wherein
   the movable core is configured to start moving in the valve opening direction on lapse of a rise period that is required to raise the electromagnetic attracting force on the energization,
   the valve body is configured to move in the valve closing direction by application of a biasing force of the valve body biasing member to move the movable core in the valve closing direction, and
   the movable core is configured to change its movement direction to the valve opening direction and to return to the initial position in an undershoot state in which the movable core continues moving in the valve closing direction even in a state where the valve body moving in the valve closing direction stops, wherein
   a return period is an estimated period required for the movable core, which is in the undershoot state caused by first energization for fuel injection, to return to the initial position from the first energization,
   an injection interval ranges from the first energization to a second energization that is for a next fuel injection, and
   an allowable period is a period obtained by subtracting the rise period estimated for the second energization from the return period,
   the fuel injection control device comprising:
   an additional energization unit configured to add an additional energization between the first energization and the second energization when the injection interval is longer than or equal to the allowable period and is shorter than or equal to the return period, wherein
   the additional energization unit does not perform the additional energization when the injection interval is longer than the return period.

2. The fuel injection control device according to claim 1, wherein
   the additional energization unit does not perform the additional energization when the injection interval is shorter than the allowable period.

3. A fuel injection control device for a fuel injection valve, the fuel injection valve including:
   an injection hole to inject fuel;
   a valve body configured to move in a valve opening direction to open the injection hole;
   a fixed core configured to generate an electromagnetic attracting force on energization of a coil;
   a movable core configured to move from a specified initial position in the valve opening direction relative to the valve body when attracted by the fixed core to move the valve body in the valve opening direction; and
   a valve body biasing member that biases the valve body in a valve closing direction opposite to the valve opening direction, wherein the movable core is configured to start moving in the valve opening direction on lapse of a rise period that is required to raise the electromagnetic attracting force on the energization, the valve body is configured to move in the valve closing direction by application of a biasing force of the valve body biasing member to move the movable core in the valve closing direction, and the movable core is configured to change its movement direction to the valve opening direction and to return to the initial position in an undershoot state in which the movable core continues moving in the valve closing direction even in a state where the valve body moving in the valve closing direction stops, wherein a return period is an estimated period required for the movable core, which is in the undershoot state caused by first energization for fuel injection, to return to the initial position from the first energization, an injection interval ranges from the first energization to a second energization that is for a next fuel injection, and an allowable period is a period obtained by subtracting the rise period estimated for the second energization from the return period, the fuel injection control device comprising:

an additional energization unit configured to add an additional energization between the first energization and the second energization when the injection interval is longer than or equal to the allowable period and is shorter than or equal to the return period, wherein the additional energization unit does not perform the additional energization when the injection interval is shorter than the allowable period.

4. The fuel injection control device according to claim 1, wherein a return-to-reference period is the return period in the undershoot state caused by the first energization without addition of the additional energization, an additional return period is the return period shortened by addition of the additional energization, and the additional energization unit is configured to perform the additional energization such that the additional return period is shorter than the injection interval.

5. The fuel injection control device according to claim 1, wherein the additional energization unit is configured to start the additional energization at a timing later than a start timing at which the undershoot state caused by the first energization starts.

6. A fuel injection control device for a fuel injection valve, the fuel injection valve including:

an injection hole to inject fuel;

a valve body configured to move in a valve opening direction to open the injection hole;

a fixed core configured to generate an electromagnetic attracting force on energization of a coil;

a movable core configured to move from a specified initial position in the valve opening direction relative to the valve body when attracted by the fixed core to move the valve body in the valve opening direction; and a valve body biasing member that biases the valve body in a valve closing direction opposite to the valve opening direction, wherein the movable core is configured to start moving in the valve opening direction on lapse of a rise period that is required to raise the electromagnetic attracting force on the energization, the valve body is configured to move in the valve closing direction by application of a biasing force of the valve body biasing member to move the movable core in the valve closing direction, and the movable core is configured to change its movement direction to the valve opening direction and to return to the initial position in an undershoot state in which the movable core continues moving in the valve closing direction even in a state where the valve body moving in the valve closing direction stops, wherein a return period is an estimated period required for the movable core, which is in the undershoot state caused by first energization for fuel injection, to return to the initial position from the first energization, an injection interval ranges from the first energization to a second energization that is for a next fuel injection, and an allowable period is a period obtained by subtracting the rise period estimated for the second energization from the return period, the fuel injection control device comprising:

an additional energization unit configured to add an additional energization between the first energization and the second energization when the injection interval is longer than or equal to the allowable period and is shorter than or equal to the return period, wherein the additional energization unit is configured to start the additional energization at a timing later than a start timing at which the undershoot state caused by the first energization starts.

7. A fuel injection control device for a fuel injection valve, the fuel injection valve including:

an injection hole to inject fuel;

a valve body configured to move in a valve opening direction to open the injection hole;

a fixed core configured to generate an electromagnetic attracting force on energization of a coil;

a movable core configured to move from a specified initial position in the valve opening direction relative to the valve body when attracted by the fixed core to move the valve body in the valve opening direction; and a valve body biasing member that biases the valve body in a valve closing direction opposite to the valve opening direction, wherein the movable core is configured to start moving in the valve opening direction on lapse of a rise period that is required to raise the electromagnetic attracting force on the energization, the valve body is configured to move in the valve closing direction by application of a biasing force of the valve body biasing member to move the movable core in the valve closing direction, and the movable core is configured to change its movement direction to the valve opening direction and to return to the initial position in an undershoot state in which the movable core continues moving in the valve closing direction even in a state where the valve body moving in the valve closing direction stops, the fuel injection control device comprising:

an additional energization unit configured to add an additional energization between the first energization and the second energization when a return timing, at which the movable core in the undershoot state caused by a first energization for fuel injection is estimated to return to the initial position, is in the rise period estimated for a second energization that is for a next fuel injection, wherein the additional energization unit is configured to start the additional energization at a timing later than a start timing at which the undershoot state caused by the first energization starts.

8. The fuel injection control device according to claim 7, wherein
a return-to-reference timing is the return timing in the undershoot state caused by the first energization without addition of the additional energization,
an additional return timing is the return timing that occurs earlier by addition of the additional energization, and
the additional energization unit is configured to perform the additional energization such that the additional return timing occurs earlier than the rise period for the electromagnetic attracting force caused by the second energization.

9. The fuel injection control device according to claim 1, wherein
the additional energization unit is configured to start the additional energization at a timing earlier than a most distant timing at which the movable core in the undershoot state is most distant from the initial position.

10. A fuel injection control device for a fuel injection valve, the fuel injection valve including:
an injection hole to inject fuel;
a valve body configured to move in a valve opening direction to open the injection hole;
a fixed core configured to generate an electromagnetic attracting force on energization of a coil;
a movable core configured to move from a specified initial position in the valve opening direction relative to the valve body when attracted by the fixed core to move the valve body in the valve opening direction; and
a valve body biasing member that biases the valve body in a valve closing direction opposite to the valve opening direction, wherein
the movable core is configured to start moving in the valve opening direction on lapse of a rise period that is required to raise the electromagnetic attracting force on the energization,
the valve body is configured to move in the valve closing direction by application of a biasing force of the valve body biasing member to move the movable core in the valve closing direction, and
the movable core is configured to change its movement direction to the valve opening direction and to return to the initial position in an undershoot state in which the movable core continues moving in the valve closing direction even in a state where the valve body moving in the valve closing direction stops, wherein
a return period is an estimated period required for the movable core, which is in the undershoot state caused by first energization for fuel injection, to return to the initial position from the first energization,
an injection interval ranges from the first energization to a second energization that is for a next fuel injection, and
an allowable period is obtained by subtracting the rise period estimated for the second energization from the return period,
the fuel injection control device comprising:
a changing energization portion configured to change a mode of the second energization, when the injection interval is longer than or equal to the allowable period and is shorter than or equal to the return period, to shorten the rise period estimated for the second energization to be shorter than:

the rise period in a case where the injection interval is shorter than the allowable period; and
the rise period in a case where the injection interval is longer than the return period.

11. A fuel injection control device for a fuel injection valve, the fuel injection valve including:
an injection hole to inject fuel;
a valve body configured to move in a valve opening direction to open the injection hole;
a fixed core configured to generate an electromagnetic attracting force on energization of a coil;
a movable core configured to move from a specified initial position in the valve opening direction relative to the valve body when attracted by the fixed core to move the valve body in the valve opening direction; and
a valve body biasing member that biases the valve body in a valve closing direction opposite to the valve opening direction, wherein
the movable core is configured to start moving in the valve opening direction on lapse of a rise period that is required to raise the electromagnetic attracting force on the energization,
the valve body is configured to move in the valve closing direction by application of a biasing force of the valve body biasing member to move the movable core in the valve closing direction,
the movable core is configured to change its movement direction to the valve opening direction and to return to the initial position in an undershoot state in which the movable core continues moving in the valve closing direction even in a state where the valve body moving in the valve closing direction stops, wherein
a return period is an estimated period required for the movable core, which is in the undershoot state caused by first energization for fuel injection, to return to the initial position from the first energization,
an injection interval ranges from the first energization to a second energization that is for a next fuel injection, and
an allowable period is obtained by subtracting the rise period estimated for the second energization from the return period,
the fuel injection control device comprising:
a pre-energization portion configured to add a pre-energization that starts at a timing earlier than the second energization and continues until start of the second energization when the injection interval is longer than or equal to the allowable period and is shorter than or equal to the return period.

12. A fuel injection control method for a fuel injection valve, wherein
implementing a first energization on a coil of a fixed core
to cause the fixed core to generate an electromagnetic attracting force to cause a movable core to start moving in a valve opening direction from a specified initial position relative to a valve body and
to cause the moving core on lapse of a rise period, which is required to raise the electromagnetic attracting force, to move the valve body in the valve opening direction to open an injection hole;
stopping the first energization
to cause the valve body to move in a valve closing direction, which is opposite to the valve opening direction, by application of a biasing force of a valve body biasing member to move the movable core in the valve closing direction subsequently to cause the movable core to be in an undershoot state in which the movable core continues moving in the valve closing direction even in a state where the valve body moving in the valve closing direction stops and subsequently to cause the movable core to change its movement direction to the valve opening direction and to return to the initial position;

implementing a second energization on the coil for a next fuel injection after an injection interval subsequent to the stopping of the first energization; and adding an additional energization on the coil between the first energization and the second energization when the injection interval is longer than or equal to an allowable period and is shorter than or equal to a return period, wherein the return period is an estimated period required for the movable core, which is in the undershoot state caused by the first energization, to return to the initial position from the first energization, and the allowable period is obtained by subtracting the rise period of the electromagnetic attracting force estimated for the second energization from the return period.

13. The fuel injection control device according to claim 1, further comprising:

an estimation unit configured to estimate the return period based on past information or experiment information.

14. The fuel injection control device according to claim 3, further comprising:

an estimation unit configured to estimate the return period based on past information or experiment information.

15. The fuel injection control device according to claim 6, further comprising:

an estimation unit configured to estimate the return period based on past information or experiment information.

16. The fuel injection control device according to claim 7, further comprising:

an estimation unit configured to estimate the return period based on past information or experiment information.

17. The fuel injection control device according to claim 10, further comprising:

an estimation unit configured to estimate the return period based on past information or experiment information.

18. The fuel injection control device according to claim 11, further comprising:

an estimation unit configured to estimate the return period based on past information or experiment information.

19. The fuel injection method according to claim 12, further comprising:

estimating the return period based on past information or experiment information.

\* \* \* \* \*